US010817731B2

(12) United States Patent
Vallespi-Gonzalez et al.

(10) Patent No.: US 10,817,731 B2
(45) Date of Patent: Oct. 27, 2020

(54) IMAGE-BASED PEDESTRIAN DETECTION

(71) Applicant: UATC, LLC, San Francisco, CA (US)

(72) Inventors: Carlos Vallespi-Gonzalez, Pittsburgh, PA (US); Joseph Lawrence Amato, Pittsburgh, PA (US); Hilton Keith Bristow, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 107 days.

(21) Appl. No.: 16/154,348

(22) Filed: Oct. 8, 2018

(65) Prior Publication Data

US 2019/0042865 A1 Feb. 7, 2019

Related U.S. Application Data

(63) Continuation of application No. 15/698,824, filed on Sep. 8, 2017, now Pat. No. 10,108,867.
(Continued)

(51) Int. Cl.
*G06K 9/00* (2006.01)
*G06T 7/73* (2017.01)
(Continued)

(52) U.S. Cl.
CPC ........ *G06K 9/00805* (2013.01); *G01S 7/4802* (2013.01); *G01S 17/42* (2013.01); *G01S 17/66* (2013.01); *G01S 17/86* (2020.01); *G01S 17/89* (2013.01); *G01S 17/93* (2013.01); *G01S 17/931* (2020.01); *G06K 9/00369* (2013.01); *G06K 9/00986* (2013.01); *G06K 9/3233* (2013.01); *G06T 7/521* (2017.01); *G06T 7/73* (2017.01); *G06K 9/3241* (2013.01);
(Continued)

(58) Field of Classification Search
CPC ........... G06K 9/00805; G06K 9/00369; G06K 9/00986; G06K 9/3233; G06K 9/3241; G06K 9/6857; G01S 17/86; G01S 17/931; G01S 7/4802; G01S 17/89; G01S 17/66; G01S 17/93; G01S 17/42; G06T 7/73; G06T 7/521; G06T 2207/10016; G06T 2207/30261; G06T 2207/30196
See application file for complete search history.

(56) References Cited

U.S. PATENT DOCUMENTS 7,526,104 B2 * 4/2009 Nagaoka ............ G06K 9/00651
348/113
8,670,034 B2 * 3/2014 Hattori ...................... B60R 1/00
345/620
(Continued)

*Primary Examiner* — Wesley J Tucker
(74) *Attorney, Agent, or Firm* — Dority & Manning, P.A.

(57) ABSTRACT

Object detection systems and methods can include identifying an object of interest within an image obtained from a camera, obtaining a first supplemental portion of data associated with the object of interest determining an estimated location of the object of interest within three-dimensional space based at least in part on the first supplemental portion of data and a known relative location of the camera, determining a portion of the LIDAR point data corresponding to the object of interest based at least in part on the estimated location of the object of interest within three-dimensional space, and providing one or more of at least a portion of the image corresponding to the object of interest and the portion of LIDAR point data corresponding to the object of interest as an output.

19 Claims, 16 Drawing Sheets

Related U.S. Application Data

(60) Provisional application No. 62/489,524, filed on Apr. 25, 2017.

(51) Int. Cl.

| | |
|---|---|
| *G06T 7/521* | (2017.01) |
| *G06K 9/32* | (2006.01) |
| *G01S 17/93* | (2020.01) |
| *G01S 17/42* | (2006.01) |
| *G01S 7/48* | (2006.01) |
| *G01S 17/89* | (2020.01) |
| *G01S 17/66* | (2006.01) |
| *G01S 17/86* | (2020.01) |
| *G01S 17/931* | (2020.01) |
| *G06K 9/68* | (2006.01) |

(52) U.S. Cl.
CPC .. *G06K 9/6857* (2013.01); *G06T 2207/10016* (2013.01); *G06T 2207/30196* (2013.01); *G06T 2207/30261* (2013.01)

(56) References Cited

U.S. PATENT DOCUMENTS

| | | | |
|---|---|---|---|
| 9,315,192 B1 | 4/2016 | Zhu | |
| 9,336,436 B1 | 5/2016 | Dowdall | |
| 10,255,525 B1* | 4/2019 | Totolos, Jr. | B60W 30/09 |
| 2008/0197284 A1* | 8/2008 | Ebenstein | B60R 1/00 |
| | | | 250/330 |
| 2011/0255741 A1* | 10/2011 | Jung | G06K 9/00369 |
| | | | 382/103 |
| 2012/0300078 A1* | 11/2012 | Ogata | G06K 9/00362 |
| | | | 348/148 |
| 2015/0343948 A1* | 12/2015 | Miyagawa | G06K 9/00805 |
| | | | 348/148 |
| 2018/0025235 A1* | 1/2018 | Fridman | G01C 21/28 |
| | | | 382/103 |
| 2018/0203446 A1* | 7/2018 | Wyffels | G01S 7/4808 |
| 2018/0365888 A1* | 12/2018 | Satzoda | G06T 7/70 |

\* cited by examiner

IMAGE-BASED PEDESTRIAN DETECTION

PRIORITY CLAIM

The present application is a continuation of U.S. application Ser. No. 15/698,824, titled Image-Based Pedestrian Detection, filed Sep. 8, 2017, which claims the benefit of priority of U.S. Provisional Patent Application Ser. No. 62/489,524, titled Image-Based Pedestrian Detection, filed Apr. 25, 2017. Applicant claims priority to and benefit of such application and incorporates such application herein by reference.

FIELD

The present disclosure relates generally to detecting objects of interest, and more particularly to detecting pedestrians within image data obtained within areas proximate to an autonomous vehicle.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

Thus, a key objective associated with an autonomous vehicle is the ability to perceive objects (e.g., vehicles, pedestrians, cyclists) that are proximate to the autonomous vehicle and, further, to determine classifications of such objects as well as their locations. The ability to accurately and precisely detect and characterize objects of interest is fundamental to enabling the autonomous vehicle to generate an appropriate motion plan through its surrounding environment.

SUMMARY

Aspects and advantages of embodiments of the present disclosure will be set forth in part in the following description, or can be learned from the description, or can be learned through practice of the embodiments.

One example aspect of the present disclosure is directed to a method for detecting pedestrians in images. The method includes identifying, by one or more electronic devices, a pedestrian within an image obtained from a camera positioned relative to a vehicle. The method also includes determining, by the one or more electronic devices, an estimated support location for the pedestrian within the image. The method also includes determining, by the one or more electronic devices, an estimated location of the pedestrian within three-dimensional space based at least in part on the estimated support location for the pedestrian within the image and a known relative location of the camera. The method also includes providing, by the one or more electronic devices, at least a portion of the image corresponding to the pedestrian and the estimated location of the pedestrian within three-dimensional space to an object classification application.

Another example aspect of the present disclosure is directed to a vehicle control system. The vehicle control system includes a camera, a LIDAR sensor, and one or more electronic devices. The camera is positioned relative to a vehicle and configured to obtain images within an area proximate to the vehicle. The LIDAR sensor is positioned relative to a vehicle and configured to obtain LIDAR point data within an area proximate to the vehicle. The one or more electronic devices are coupled to the camera and the LIDAR sensor. The one or more electronic devices are configured to receive image data from the camera and LIDAR point data from the LIDAR sensor and perform operations. The operations include identifying an object of interest within an image obtained from the camera. The operations also include determining an estimated location of the object of interest within three-dimensional space based at least in part on a known relative location of the camera. The operations also include determining a portion of the LIDAR point data corresponding to the object of interest based at least in part on the estimated location of the object of interest within three-dimensional space. The operations also include providing one or more of at least a portion of the image corresponding to the object of interest and the portion of LIDAR point data corresponding to the object of interest as an output.

Another example aspect of the present disclosure is directed to an autonomous vehicle. The autonomous vehicle includes one or more cameras, a field programmable gate array (FPGA) device, one or more processors, and one or more non-transitory computer-readable media. The cameras are configured to obtain images within an environment proximate to an autonomous vehicle. The FPGA device is coupled to the one or more cameras. The FPGA device is configured to receive an image from the one or more cameras, generate a multi-scale image pyramid of multiple image samples having different scaling factors, and analyze successive image patches within each of the multiple image samples using a sliding window of fixed size to identify objects of interest within the successive image patches. The one or more non-transitory computer-readable media collectively stores instructions that, when executed by the one or more processors, cause the one or more processors to perform operations. The operations include providing at least a portion of the image corresponding to each object of interest to an object classification application.

Other aspects of the present disclosure are directed to various systems (e.g., computing systems, vehicle systems, image processing systems), apparatuses (e.g., vehicles, computing devices, image processors), non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
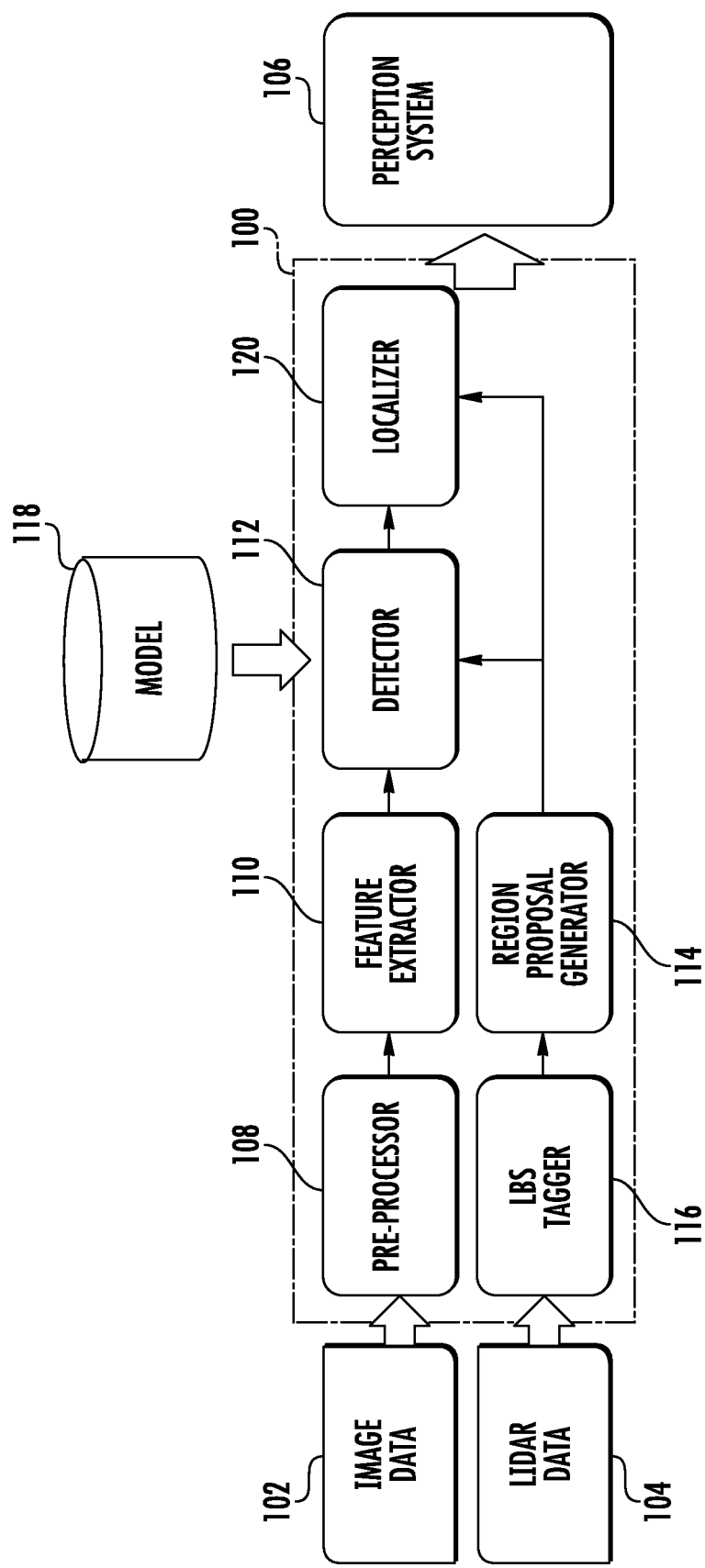
FIG. 1 depicts a block diagram of an example detection system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are generally directed to object detection technology for vehicle applications. Object detection and classification within images for vehicle applications can require a substantial amount of processing power and analytical precision to yield effective and accurate results. The disclosed technology employs object detection techniques that can provide substantial improvements to that end by utilizing one or more cameras in conjunction with one or more electronic devices (e.g., a field programmable gate array (FPGA) device and/or one or more computing devices). The one or more electronic devices can be configured to implement object detection and localization. In object detection, objects of interest (e.g., a pedestrian, a bicycle, a vehicle) can be detected within an image. In object localization, an estimated location of the object of interest within three-dimensional (3D) space can be determined. This estimated location can be determined by determining and analyzing one or more additional portions of sensor data captured relative to an object of interest detected within the image. For example, the one or more additional portions of sensor data can correspond to LIDAR data, RADAR data, image data, texture data, map data, and/or geometry data. At least a portion of the image corresponding to the object of interest and/or the one or more additional portions sensor data corresponding to the object of interest then can be provided to an object classification application. Because objects of interest are detected within images with increased accuracy and speed, the systems and methods of the present disclosure facilitate improvements to object classification, tracking and related vehicle applications.

In one particular aspect of the disclosed technology, objects of interest can be identified within an image obtained from a camera that is positioned relative to a vehicle. Objects of interest can include pedestrians, vehicles, bicycles or other objects. In some implementations, object detection within an image can include generating a multi-scale image pyramid of multiple image samples having different scaling factors, and analyzing successive image patches within each of the multiple image samples using a sliding window of fixed size to identify objects of interest within the successive image patches.

In some implementations, a region proposal can be determined within each image and/or image sample. The region proposal can have a smaller area than its corresponding image and/or image sample. A region proposal for each image and/or image sample can be determined using one or more techniques. In some implementations, for example, a region proposal can be determined based at least in part on the locations within an image that correspond to locations for which corresponding LIDAR point data is also obtained. In some implementations, for example, a region proposal can be determined at least in part from locations within the image determined to correspond to foreground as opposed to background. In some implementations, for example, a region proposal can be determined as one or more static regions within a given image and/or image scale inclusive of a vehicle travel path along a ground surface and/or a fixed horizon. Objects of interest can then be determined within the region proposal for each image and/or image sample in order to provide more focused and faster image processing and object detection. Portions of the image and/or image scale within the region proposal can be analyzed in part based on an assumption that pedestrians or other objects of interest can appear smaller as they are located farther from a camera towards a horizon.

In accordance with another particular aspect of the disclosed technology, estimated support locations for objects of interest (e.g., pedestrians, etc.) can be determined within each image and/or image sample. In some examples, the estimated support locations can vary based on the type of object of interest. For example, an estimated support location for a pedestrian can correspond to a location within an image corresponding to the feet of a pedestrian, while an estimated support location for a vehicle or bicycle can correspond to a location within an image corresponding to one or more wheels. For pedestrian detection, determining an estimated support location for a pedestrian can sometimes depend on whether the feet of the pedestrian are visible within the image. When feet of a pedestrian are visible, determining an estimated support location for the pedestrian within the image can include determining a location within the image that corresponds to the feet of the pedestrian. When the feet of the pedestrian are not visible, determining an estimated support location for the pedestrian within the image can include determining a location within the image that corresponds to the head of the pedestrian and determining the support location for the pedestrian based at least in part on the location within the image that corresponds to the head of the pedestrian and an estimated height of the pedestrian.

In accordance with another particular aspect of the disclosed technology, an estimated location of the pedestrian or other object of interest within three-dimensional space can be determined based at least in part on the estimated support location for the pedestrian or other object of interest within the image and a known relative location of the camera (e.g., a location of the camera relative to the ground, the vehicle, etc.).

In some implementations, the estimated location of the pedestrian can be improved by obtaining map data descriptive of a geographic area surrounding the vehicle. The map data can include relative locations of ground surfaces proximate to the vehicle. A revised estimated location of the pedestrian or other object of interest within three-dimensional space can be based at least in part on the estimated location and the map data. For example, a revised estimated location can be adjusted from an (initial) estimated location to the nearest point within three-dimensional space corresponding to a surface on the ground as identified within the map data. This technique for improving an estimated location of the pedestrian operates under the assumption that detected pedestrians will be walking on a ground surface as opposed to being suspended in the air or some other unfeasible or unlikely location. The use of map data can help improve the accuracy of estimated locations and/or otherwise provide appropriate boundary parameters for permissible object locations.

The estimated location of the pedestrian or other object of interest within three-dimensional space can then be used at least in part to determine a portion of LIDAR point data corresponding to the pedestrian. For example, a cluster of LIDAR data points of a predetermined size can be identified near a location within a point cloud corresponding to the estimated location of the pedestrian within three-dimensional space. The portion of LIDAR point data corresponding to the pedestrian can then be provided additionally or alternatively with at least a portion of an image corresponding to the pedestrian to an object classification application and/or other image processing application and/or object detection application.

In some example embodiments, a detection system can include one or more sensors including a camera positioned relative to a vehicle and configured to obtain images within an area proximate to the vehicle and a LIDAR sensor positioned relative to a vehicle and configured to obtain LIDAR point data within an area proximate to the vehicle. The detection system can also include one or more electronic devices coupled to the camera and the LIDAR sensor, the one or more electronic devices configured to receive image data from the camera and LIDAR point data from the LIDAR sensor and perform operations. The electronic devices can include, for example, one or more programmable circuit devices such as a field programmable gate array (FPGA) device.

The FPGA device or other programmable circuit device can include a plurality of logic blocks and interconnectors that can be programmed into specific configurations for implementing various operations. In some implementations, such various operations can include one or more image processing pipelines. In some examples, such various operations can include a first image processing pipeline for image transformation and a second image processing pipeline for object detection. The image transformation and object detection pipelines can result in generation and classification of multiple different image variations simultaneously because the pipelines are implemented using an FPGA device as opposed to conventional processor-based computing devices.

In some example implementations, the first image processing pipeline for image transformation can more particularly include a plurality of logic blocks and interconnectors programmed to implement one or more transformation techniques including De-Bayering, gamma correction, bit conversion, rectification, color space conversion, resizing, anti-aliasing and/or blur reduction.

In some implementations, the first image processing pipeline for image transformation can more particularly include a plurality of logic blocks and interconnectors programmed to resize the image data obtained by the one or more image sensors. In some implementations, for example, image resizing can include downsampling the image data into a multi-scale image pyramid. The multi-scale image pyramid can include image data that is translated into multiple image samples having different scaling factors. In some implementations, the multi-scale image pyramid can be characterized by a number of octaves (e.g., powers of two) and a number of scales per octave. Some or all of the image samples generated by the first image processing pipeline can then be provided as input to the second image processing pipeline for object detection.

In some implementations, for example, the second image processing pipeline for object detection can more particularly include a plurality of logic blocks and interconnectors programmed to identify and aggregate features within one or more of the multiple image samples within a multi-scale image pyramid. The second image processing pipeline can also access a classification model, for example a classification model that is stored in one or more memory devices (e.g., DRAM) accessible by the programmable circuit device (e.g., FPGA). The classification model can be configured to classify image portions and/or image features as including or not including detected objects.

The features identified and aggregated from the image samples can be provided as input to the classification model.

An output then can be received from the classification model corresponding to objects detected within the image data (e.g., vehicles, cyclists, pedestrians, traffic control devices, etc.) In some examples, the output from the classification model can include an indication of whether image features include or do not include detected objects. For features that include detected objects, the classification model can include a classification for a detected object as one or more objects from a predetermined set of objects. In some examples, the classification model can also output a probability score associated with the classification, the probability score being indicative of a probability or likelihood of accuracy for the classification. In some implementations, the classification model can include a decision tree classifier. In some implementations, the classification model can include a machine-learned model such as but not limited to a model trained as a neural network, a support-vector machine (SVM) or other machine learning process.

In some implementations, for example, the second image processing pipeline for object detection can more particularly include a plurality of logic blocks and interconnectors programmed to identify and aggregate edge portions within some or all of the image samples in the multi-scale image pyramid. In some examples, the object detection pipeline is further configured to implement an angle binning algorithm that determines an angle classification for each of the identified edge portions and assigns each edge portion to one of a plurality of different bins based at least in part on the angle classification determined for that edge portion. A histogram, such as but not limited to a histogram of oriented gradients, descriptive of the plurality of different bins can be generated. In some examples, the plurality of different bins can be defined to have different sizes based on the amount of image data in each image sample such that bin sizes are smaller for image samples having a greater amount of image data.

In some implementations, for example, the second image processing pipeline for object detection can more particularly include a plurality of logic blocks and interconnectors programmed to generate one or more channel images from the image data, each channel image corresponding to a feature map that maps a patch of one or more input pixels from the image data to an output pixel within the channel image.

In some implementations, for example, the second image processing pipeline for object detection can more particularly include a plurality of logic blocks and interconnectors programmed to determine a sliding window of fixed size, analyze successive image patches within each of the multiple image samples using the sliding window of fixed size, and identify objects of interest within the successive image patches. In some examples, image patches can be pooled into image regions associated by like features within each of the multiple image samples. Pooled image regions can be identified by boxes or other bounding shapes identified within an image. In some examples, the pooled image regions can be provided as an input to the classification model, which then generates an output corresponding to detected objects of interest within the image regions.

In some examples, one or more outputs from the classification model and/or some or all of the image data including one or more image variations can be provided as output data to one or more computing devices in a vehicle control system. The vehicle control system can control an operational parameter of a vehicle (e.g., speed, direction, etc.) in response to detection of at least one object of interest in the image data. In this manner, a vehicle can turn and/or stop upon conditions being detected within the image data, including but not limited to the approach of another vehicle, a pedestrian crossing the road, a red traffic light being detected at an intersection, and the like. The one or more computing devices can include a perception system, a prediction system, and a motion planning system that cooperate to perceive the surrounding environment of a vehicle and determine a motion plan for controlling the motion of the vehicle accordingly.

In some examples, a vehicle control system configured to analyze image data and/or outputs from a disclosed detection system can be provided as an integrated component in an autonomous vehicle. The autonomous vehicle can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

In particular, in some implementations, the perception system can receive image data, LIDAR point data, and/or object detection information. The image data, LIDAR point data, and/or object detection information can be collectively analyzed to determine the location (e.g., in three-dimensional space relative to the autonomous vehicle) of points that correspond to objects within the surrounding environment of the autonomous vehicle (e.g., at one or more times).

The perception system can identify one or more objects that are proximate to the autonomous vehicle based on some or all of the image data, image classification information and sensor data. In particular, in some implementations, the perception system can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class of characterization (e.g., vehicle versus pedestrian versus bicycle versus other); yaw rate; and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time.

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object and/or the state data for the object provided by the perception system. Stated differently, given information about the current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can evaluate a cost function for each of one or more candidate motion plans for the autonomous vehicle based at least in part on the current locations and/or predicted future locations of the objects. For example, the cost function can provide a cost (e.g., over time) of adhering to a particular candidate motion plan. For example, the cost provided by a cost function can increase when the autonomous vehicle approaches impact with another object and/or deviates from a preferred pathway (e.g., a predetermined travel route).

Thus, given information about the current locations and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control gas flow, steering, braking, etc.) to execute the selected motion plan.

The systems and methods described herein may provide a number of technical effects and benefits. For instance, use of image-based object detection can yield improved accuracy in detecting objects within an area proximate to a vehicle. The generally higher resolution data currently available from cameras as opposed to other data sources (e.g., LIDAR, RADAR, etc.) make it well suited for accurately detecting objects of interest near a vehicle. Specific algorithms for image-based object detection can include transforming initially obtained image data into multiple different variations (e.g., different image samples in a multi-scale image pyramid and/or multiple different channel images generated from original image data), and analyzing successive image patches within each of the multiple image samples using a sliding window of fixed size to identify objects of interest within the successive image patches. Parallel processing on the image variations can provide more comprehensive image analysis. The likelihood of detecting objects within image regions or other image portions in an effective and timely manner can thus be significantly enhanced.

The systems and methods described herein may provide an additional technical effect and benefit of improved processing speed and reduced latency for object detection applications. For instance, image processing systems and methods that implement image transformation and/or object detection using an FPGA device coupled to one or more cameras can generally provide faster image processing speed and reduce potential processing latencies. Image processing with an FPGA device corresponding to a single programmable chip coupled to the one or more cameras helps to greatly improve the processing speed for feature extraction, object detection and/or other image processing aspects as disclosed herein. Utilization of an FPGA device can provide system functionality to perform a vast number of image processing operations (e.g., on the order of thousands of processing operations or more) in parallel including multi-scale image analysis as opposed to the linear functionality afforded by conventional processor-based computing devices that implement one set of instructions at a time. The improved image processing capacity afforded by coupling an FPGA device with one or more cameras can help achieve a level of image processing functionality that was otherwise unachievable with micro-processor functionality in conventional computing devices.

The systems and methods described herein can also provide an additional technical effect and benefit of improving the classification and tracking of objects of interest in a perception system of an autonomous vehicle. For example, performing more accurate segmentation provides for improved tracking by having cleaner segmented objects and provides for improved classification once objects are properly segmented. Such improved object detection accuracy can be particularly advantageous for use in conjunction with vehicle computing systems for autonomous vehicles. Because vehicle computing systems for autonomous vehicles are tasked with repeatedly detecting and analyzing objects in sensor data for tracking and classification of objects of interest (including other vehicles, cyclists, pedestrians, traffic control devices, and the like) and then determining necessary responses to such objects of interest, improved object detection can lead to faster and more accurate object tracking and classification. Improved object tracking and classification can have a direct effect on the provision of safer and smoother automated control of vehicle systems and improved overall performance of autonomous vehicles.

The systems and methods described herein may also provide resulting improvements to computing technology tasked with image classification and object detection. Improvements in the speed and accuracy of object detection can directly improve operational speed and reduce processing requirements for vehicle computing systems, ultimately resulting in more efficient vehicle control. By providing an image processing system that includes an FPGA device configured to implement image transformation and object detection, valuable computing resources within a vehicle control system that would have otherwise been needed for such tasks can be reserved for other tasks such as object prediction, route determination, autonomous vehicle control, and the like.

With reference to the figures, example embodiments of the present disclosure will be discussed in further detail.

FIG. 1 depicts a block diagram of an example detection system according to example embodiments of the present disclosure. More particularly, a detection system 100 can obtain data from a plurality of sensors, including at least image data 102 as well as optional LIDAR data 104. Image data 102 can be acquired by one or more cameras within a sensor system, while LIDAR data 104 can be acquired by one or more Light Detection and Ranging (LIDAR) sensors within a sensor system. In some implementations, the sensor system configured to obtain image data 102 and LIDAR data 104 can be part of or otherwise associated with a vehicle (e.g., an autonomous vehicle) such that the image data 102 and/or LIDAR data 104 captures data associated with an environment that is proximate to the vehicle. Additional exemplary details regarding particular sensors for obtaining image data 102 and LIDAR data 104 are illustrated in and described with reference to, for example, FIGS. 3 and 5.

Detection system 100 can be configured to receive image data 102 and LIDAR data 104 and determine segments within the data that contain objects of interest. In some implementations, data segments determined by detection system 100 can be relayed to a perception system 106 of an autonomous vehicle application such as but not limited to an application configured to implement object detection, classification, and/or tracking of objects of interest within a given environment. Objects of interest can include pedestrians, vehicles, bicycles or other objects. Detection system 100 can more particularly include a pre-processor 108, a feature extractor 110, a detector 112 with access to a classification model 118, a region proposal generator 114, an LBS tagger 116, and/or a localizer 120.

Referring more particularly to pre-processor 108, pre-processor 108 can be configured to perform preliminary image processing on image data 102 in order to enhance or otherwise prepare the image data 102 for effective object detection. Pre-processor 108 may include the implementation of one or more filters, one or more downsamplers, or other processing techniques, examples of which are illustrated in and described with reference to FIG. 2, including one or more components of first image processing pipeline 140. In some implementations, pre-processor 108 can be configured to generate a multi-scale image pyramid of multiple image samples having different scaling factors.

Feature extractor 110 can be configured to generally identify portions of the image data 102 sent through pre-processor 108 for analysis by detector 112. In some implementations, feature extractor 110 can analyze successive image patches within each of the multiple image samples using a sliding window of fixed size to identify image regions (e.g., features) within the successive image patches for evaluation by detector 112. Feature extractor 110 can include the implementation of one or more filters, pooling techniques, or other processing techniques, examples of which are illustrated in and described with reference to FIG. 2, including one or more components of second image processing pipeline 150.

In some implementations, feature extractor 110 can be configured to identify portions of image data 102 for analysis by detector 112 that are within a region proposal (e.g., a portion of image data or an image sample that has a smaller area than its corresponding image and/or image sample). As such, detection system 100 can include a region proposal generator 114 configured to help generate such region proposals. In some implementations, for example, region proposal generator can determine region proposals based at least in part on the locations within image data 102 that correspond to locations for which corresponding LIDAR data 104 is also obtained. In some implementations, for example, a region proposal can be determined by region proposal generator 114 based at least in part on locations within the image data 102 determined to correspond to foreground as opposed to background based on analysis of LIDAR data 104.

Foreground versus background regions within LIDAR data 104 can be determined at least in part from LBS tags generated by LBS tagger 116. LBS tagger 116 can correspond, for example, to a processing component configured to apply a LIDAR Background Subtraction (LB S) filter to LIDAR data 104. An LBS filter can subtract background LIDAR points within LIDAR data 104 so as to only produce output on or otherwise tag the remaining foreground LIDAR points within LIDAR data 104. In some implementations, there is a greater likelihood of detecting objects of interest within foreground data points as opposed to background data points covering areas such as sky, background objects/structures, and the like. Foreground data points are much more likely to include data points along a ground surface where objects such as pedestrians, vehicles, bicycles, etc. can be present and detected. As such, foreground LIDAR data points identified by LBS tagger 116 can provide improvements to region proposals generated by region proposal generator 114 and object detection (as well as planning and controlling the operation of an autonomous vehicle). Such use of LBS techniques can improve processing speed as well as overall performance of autonomous vehicle applications and systems.

In some implementations, region proposals can be identified within image data 102 or respective image samples generated by pre-processor 108 in a manner that does not include analysis of LIDAR data 104. In some implementations, for example, a region proposal can be determined as a static region within a given image and/or image scale inclusive of a vehicle travel path along a ground surface and/or a fixed horizon. Objects of interest can then be determined within the region proposal for each image and/or image sample in order to provide more focused and faster image processing and object detection. Portions of the image and/or image scale within the region proposal can be analyzed in part based on an assumption that pedestrians or other objects of interest can appear smaller as they are located farther from a camera towards a horizon.

After image regions corresponding to particular segments are identified within image data 102, the image regions are provided as input to detector 112. Detector 112 can be configured to access a classification model 118. Classification model 118 can be configured to classify image portions and/or image features as including or not including detected objects. In some implementations, classification model 118 can be stored in one or more memory devices (e.g., DRAM) accessible by detection system 100. In some implementations, the classification model 118 can include a decision tree classifier or other supervised learning model. In some implementations, the classification model 118 can be a machine-learned model such as but not limited to a model trained as a neural network, a support-vector machine (SVM) or other machine learning process.

More particularly, detector 112 can be configured to provide the image regions from feature extractor 110 as input to the classification model 118. A classification output then can be received from the classification model 118 corresponding to objects detected within the image data. In some examples, the classification output from classification model 118 can include an indication of whether image regions include or do not include one or more objects. For image regions that include detected objects, the classification output from classification model 118 can include a classification for a detected object as one or more classes from a predetermined set (e.g., vehicles, cyclists, pedestrians, traffic control devices, etc.). In some examples, the classification output from classification model 118 can also include a probability score associated with the classification. For example, the probability score can be indicative of a probability or likelihood of accuracy for the classification (e.g., a likelihood that an object is or is not detected, or a likelihood that a classification for an object (e.g., as a pedestrian, bicycle, vehicle, etc.) is correct.

Referring still to FIG. 1, a localizer 120 can also be configured to receive the classification output from detector 112 as well as one or more supplemental portions of data (e.g., LIDAR data 104) in order to generally determine an estimated location in three-dimensional (3D) space for each detected object of interest within image data 102 as determined by detector 112. In some examples, localizer 120 can help correlate objects detected within image data 102 to corresponding data points within one or more supplemental portions of data (e.g., LIDAR data 104) that correspond to the detected object. In some implementations, an estimated location in 3D space for a detected object can be determined by localizer 120 based at least in part on the one or more supplemental portions of data (e.g., LIDAR data 104). In some implementations, the estimated location of the pedestrian can be improved by obtaining a second supplemental portion of data associated with a detected object (e.g., map data descriptive of a geographic area surrounding the vehicle). The map data can include relative locations of ground surfaces proximate to the vehicle. A revised estimated location of the pedestrian or other object of interest within three-dimensional space can be based at least in part on the second supplemental portion of data. For example, a revised estimated location can be adjusted from an (initial) estimated location to the nearest point within three-dimensional space corresponding to a surface on the ground as identified within the map data. This technique for improving an estimated location of the pedestrian operates under the assumption that detected pedestrians will be walking on a ground surface as opposed to being suspended in the air or some other unfeasible or unlikely location. The use of map data can help improve the accuracy of estimated locations and/or otherwise provide appropriate boundary parameters for permissible object locations.

Referring still to localizer 120, the estimated location of the pedestrian or other object of interest within three-dimensional space can then be used at least in part to determine a portion of supplemental data (e.g., LIDAR point data) corresponding to the pedestrian. For example, a cluster of LIDAR data points within LIDAR data 104 having a predetermined size (e.g., of an average or estimated height for a particular object such as a pedestrian) can be identified near a location within a point cloud (e.g., LIDAR data 104) corresponding to the estimated location of the pedestrian within three-dimensional space. The portion of LIDAR point data corresponding to the pedestrian (e.g., portion of LIDAR data 104) can then be provided additionally or alternatively with at least a portion of an image corresponding to the pedestrian (e.g., portion of image data 102) to an object classification application and/or other image processing application and/or object detection application (e.g., perception system 106).

Figure 2:
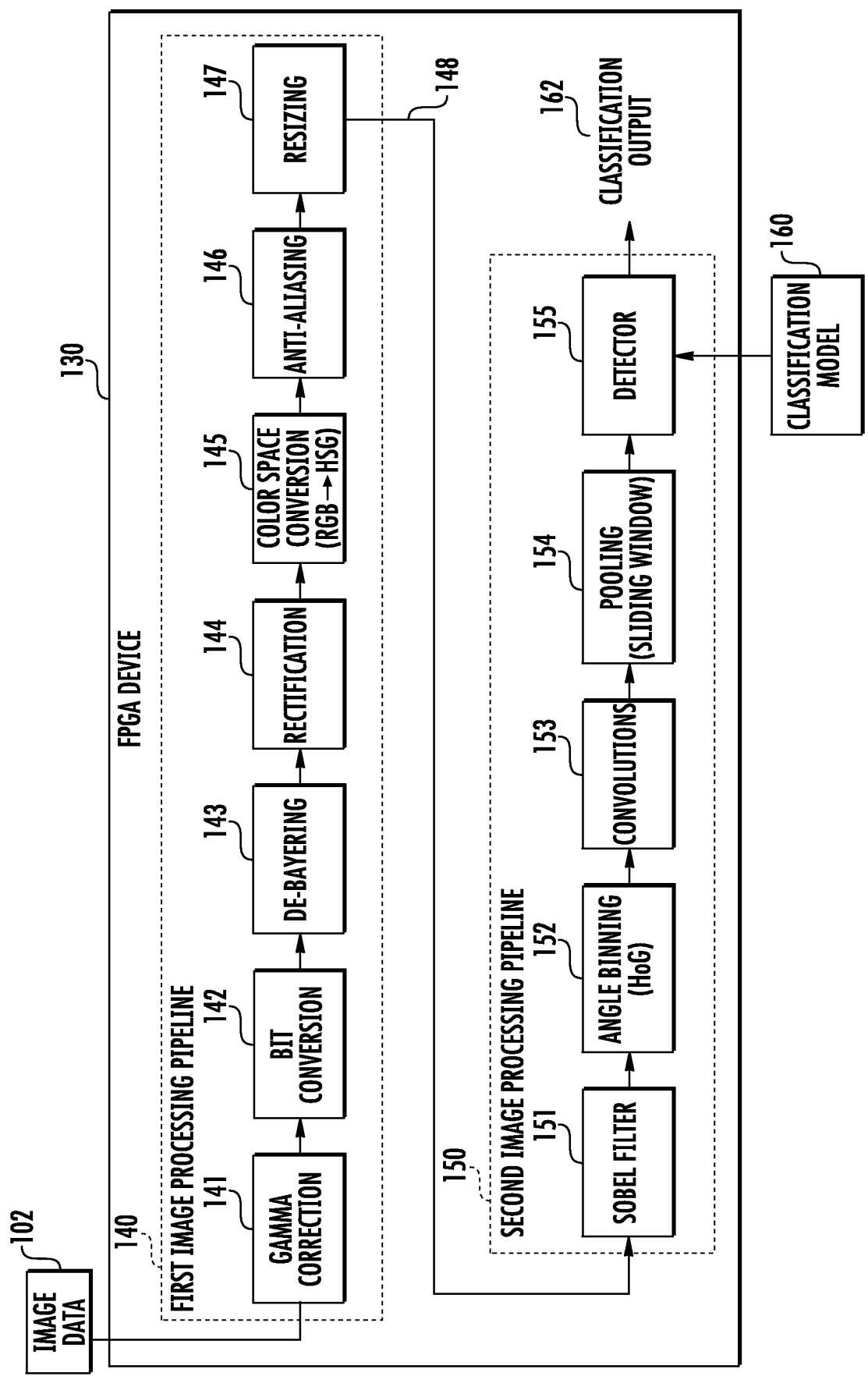
FIG. 2 depicts a block diagram of an example programmable circuit device (e.g., FPGA device) according to example embodiments of the present disclosure.

FIG. 2 depicts a block diagram of an example programmable circuit device (e.g., FPGA device 130) according to example embodiments of the disclosed technology that can be included within detection system 100 to implement pre-processor 108, feature extractor 110 and detector 112. Image data 102, such as captured by an image sensor within one or more cameras can be provided as input to the FPGA device 130. Data link(s) for providing image data 102 can operate using different signaling protocols, including but not limited to a Low-Voltage Differential Signaling (LVDS) protocol, a lower voltage sub-LVDS protocol, a Camera Serial Interface (CSI) protocol using D-PHY and/or M-PHY physical layers, or other suitable protocols and interface layers. The FPGA device 130 can be provided as an integral part of a camera or a separate component interfaced with one or more cameras. Additional description of a camera for obtaining image data 102 is provided in FIG. 5.

FPGA device 130 can include a plurality of logic blocks and interconnectors that can be programmed into specific configurations for implementing various operations. In some implementations, such various operations can include one or more image processing pipelines. In some examples, such various operations can include a first image processing pipeline 140 for image transformation and a second image processing pipeline 150 for object detection. The first and second image processing pipelines 140, 150 can result in generation and classification of multiple different image variations simultaneously because the pipelines are implemented using FPGA device 130 as opposed to conventional processor-based computing devices. Although FPGA device 130 is described herein as including various components as part of a respective first image processing pipeline 140 and second image processing pipeline 150, it should be appreciated that an FPGA device 130 can alternatively implement a combination of components from such pipelines into a single pipeline or multiple different pipelines (e.g., two or more in different combinations than described herein).

In some example implementations, the first image processing pipeline 140 for image transformation can more particularly include a plurality of logic blocks and interconnectors programmed to implement one or more transformation components including a gamma correction component 141, a bit conversion component 142, a de-Bayering component 143, a rectification component 144, a color space conversion component 145, an anti-aliasing component 146, and a resizing component 147. Although multiple components are described as part of the first image processing pipeline 140, it should be appreciated that embodiments of the disclosed technology need not include all such components. As such, some of the components within first image processing pipeline 140 can be optional to accommodate selective customization of image transformation features. In addition, the components of first image processing pipeline 140 can be implemented in a different order than shown in FIG. 2, when suitable.

Referring more particularly to the gamma correction component 141, a plurality of logic blocks and interconnectors within FPGA device 130 can be programmed to implement a nonlinear contrast adjustment to image data 102. Gamma correction component 141 can be configured to ultimately control the brightness within image data in a manner that provides enhanced distinction among captured image features to facilitate better object detection.

Referring more particularly to the bit conversion component 142, a plurality of logic blocks and interconnectors within FPGA device 130 can be programmed to convert image data 102 from a floating point representation to fixed point integer-based representation. In some examples, converting image data 102 to an integer-based representation can include resizing image data values characterized by a first number of bits to image data values characterized by a second number of bits. In some implementations, the second number of bits can be different and smaller than the first number of bits. In some implementations, each bit in the first number of bits can be analyzed using a technique such as a histogram to determine which bits in the first number of bits is more important to the image data (e.g., which bits convey image data that is more likely to include objects of interest within an image). The histogram or other technique can then be used to help determine which bits in the second number of bits are kept from the first number of bits and which bits or discarded or otherwise modified.

Referring more particularly to the de-Bayering component 143, a plurality of logic blocks and interconnectors within FPGA device 130 can be programmed to convert image data that has been received through a color filter array into a data format that includes multiple color components per pixel. For example, an array of image sensor elements (e.g., corresponding to respective pixels) can be positioned relative to a color filter array having one or more different color filter elements. The particular arrangement of color filter elements can vary. For example, some color filter elements can be red, blue, green, and/or clear/white. De-Bayering component 143 can be configured to receive light of a particular color at each image sensor element, and then reconstruct a full color image by interpolating values for multiple color components at each image sensor element or pixel within the image data.

Referring more particularly to the rectification component 144, a plurality of logic blocks and interconnectors within FPGA device 130 can be programmed to implement an alignment transformation that shifts image data 102 to positions within a reference system (e.g., another image, a map of area surrounding a vehicle, and/or a reference grid of points defining three-dimensional space surrounding a vehicle).

Referring more particularly to the color space conversion component 145, a plurality of logic blocks and interconnectors within FPGA device 130 can be programmed to convert image data 102 from a representation having multiple color components into a greyscale representation. In some examples, such image transformation can more particularly correspond to converting image data into a multi-parameter (HSG) representation corresponding to values for an image hue (H) parameter, an image saturation (S) parameter, and an image greyscale (G) parameter. The image hue (H) parameter can be representative of the light property for image data that characterizes how color is classified as one of multiple color parameters (e.g., red, green, blue, white, yellow, etc.) relative to one or more respective pure reference values for each color parameter in the color spectrum. The image saturation (S) parameter can be representative of the light property for image data that characterizes the intensity of color within the image relative to brightness. The image greyscale (G) parameter can be representative of the light property for image data that characterizes the intensity of monochrome light for each pixel within an image. The use of multi-parameter HSG representations for image data 102 can provide an enhanced image data format that has proven to be beneficial for image-based object detection applications. These benefits are achieved in part by the type of image information captured using the hue, saturation and greyscale parameters.

Referring more particularly to the anti-aliasing component 146, a plurality of logic blocks and interconnectors within FPGA device 130 can be programmed to implement an image filter that splits respective optical points (e.g., image data pixels) into a cluster of points. This anti-aliasing component 146 can help ensure a proper sampling of image data 102 before the image data is resized into multiple samples via resizing component 147.

Referring more particularly to the resizing component 147, a plurality of logic blocks and interconnectors within FPGA device 130 can be programmed to resize the image data 102 obtained by the one or more cameras. In some implementations, for example, image resizing at resizing component 147 can include downsampling the image data 102 into a multi-scale image pyramid. The multi-scale image pyramid can include image data that is translated into multiple image samples 148 having different scaling factors. In some implementations, the multi-scale image pyramid can be characterized by a number of octaves (e.g., powers of two) and a number of scales per octave. Additional context for downsampling image data 102 is depicted in and described with reference to FIG. 8, which illustrates an example multi-scale image pyramid.

Referring still to FIG. 2, some or all of the image samples 148 generated by the first image processing pipeline 140 can then be provided as input to the second image processing pipeline 150 for object detection. In some example implementations, the second image processing pipeline 150 for image transformation can more particularly include a plurality of logic blocks and interconnectors programmed to implement one or more components including a Sobel filter component 151, an angle binning component 152, a convolution component 153, a pooling component 154, and a detector component 155. Although multiple components are described as part of the second image processing pipeline 150, it should be appreciated that embodiments of the disclosed technology need not include all such components. As such, some of the components within second image processing pipeline 150 can be optional to accommodate selective customization of image transformation features. In addition, the components of second image processing pipeline 150 can be implemented in a different order than shown in FIG. 2, when suitable.

Referring more particularly to the Sobel filter component 151, a plurality of logic blocks and interconnectors within FPGA device 130 can be programmed to identify and enhance directional changes in the light intensity between adjacent pixels or other designated portions of each image sample 148. For each image point, these directional changes can be represented by a horizontal derivative representing changes in image intensity in the horizontal direction and a vertical derivative representing changes in image intensity in the vertical direction. In some implementations, the output of Sobel filter component 151 is an image sample 148 having enhanced edges resulting from a modification of the image data within each image sample 148 based at least in part on the determined horizontal and vertical derivatives at each image point.

Referring more particularly to the angle binning component 152, a plurality of logic blocks and interconnectors within FPGA device 130 can be programmed to implement an angle binning algorithm that characterizes the directional changes in image intensity determined within the Sobel filter component 151. In some implementations, angle binning component 152 is configured to determine a spatial gradient magnitude for image points within each image sample based at least in part on the horizontal and vertical derivatives determined by Sobel filter component 151. In some implementations, angle binning component 152 is further configured to characterize the spatial gradient magnitudes on a per point/pixel basis within each image sample. In other implementations, spatial gradient measurements can be characterized on a per feature basis within each image sample, where each feature is part of a channel image feature map that maps a patch of one or more input pixels from image data to an output pixel within the channel image feature map.

More particularly, in some examples, the angle binning component 152 is configured to determine an angle classification for each of the identified image components (e.g., pixels, features and/or edge portions) and assigns each image component to one of a plurality of different bins based at least in part on the angle classification determined for that image component. A histogram, such as but not limited to a histogram of oriented gradients, descriptive of the plurality of different bins within angle binning component 152 can be generated. In some examples, the plurality of different bins can be defined to have different sizes based on the amount of image data in each image component such that bin sizes are smaller for image components having a greater amount of image data.

Referring more particularly to the convolution component 153, a plurality of logic blocks and interconnectors within FPGA device 130 can be programmed to filter image samples 148 using one or more convolution matrices to sharpen and enhance edges within each image sample. In some implementations, convolution component utilizes a plurality of convolution matrices, for example on the order of between about 4 matrices and about 20 matrices, each matrix having N×N integer values, with the matrix size value N being between about 3 and 6.

Referring more particularly to the pooling component 154, a plurality of logic blocks and interconnectors within FPGA device 130 can be programmed to determine a sliding window of fixed size, analyze successive image patches within each of the multiple image samples 148 using the sliding window of fixed size, and identify objects of interest within the successive image patches. In some examples, image patches can be pooled into image regions associated by like features within each of the multiple image samples. Pooled image regions can be identified by boxes or other bounding shapes identified within an image. In some examples, the pooled image regions can be provided as an input to the detector component 155, which then generates an output corresponding to detected objects of interest within the image regions.

Referring more particularly to the detector component 155, the FPGA device 130 can be configured to access a classification model 160 that is configured to classify image portions and/or image features as including or not including detected objects. In some implementations, classification model 160 can correspond, for example, to classification model 118 of FIG. 1. In some implementations, classification model 160 can be stored in one or more memory devices (e.g., DRAM) accessible by FPGA device 130. In some implementations, the classification model 160 can include a decision tree classifier or other supervised learning model. In some implementations, the classification model 160 can be a machine-learned model such as but not limited to a model trained as a neural network, a support-vector machine (SVM) or other machine learning process.

More particularly, the detector component 155 can be configured to provide the image regions from pooling component 154 as input to the classification model 160. A classification output 162 then can be received from the classification model 160 corresponding to objects detected within the image data. In some examples, the classification output 162 from classification model 160 can include an indication of whether image regions include or do not include one or more objects. For image regions that include detected objects, the classification output 162 from classification model 160 can include a classification for a detected object as one or more classes from a predetermined set (e.g., vehicles, cyclists, pedestrians, traffic control devices, etc.). In some examples, the classification output 162 from classification model 160 can also include a probability score associated with the classification. For example, the probability score can be indicative of a probability or likelihood of accuracy for the classification (e.g., a likelihood that an object is or is not detected, or a likelihood that a classification for an object (e.g., as a pedestrian, bicycle, vehicle, etc.) is correct.

Figure 3:
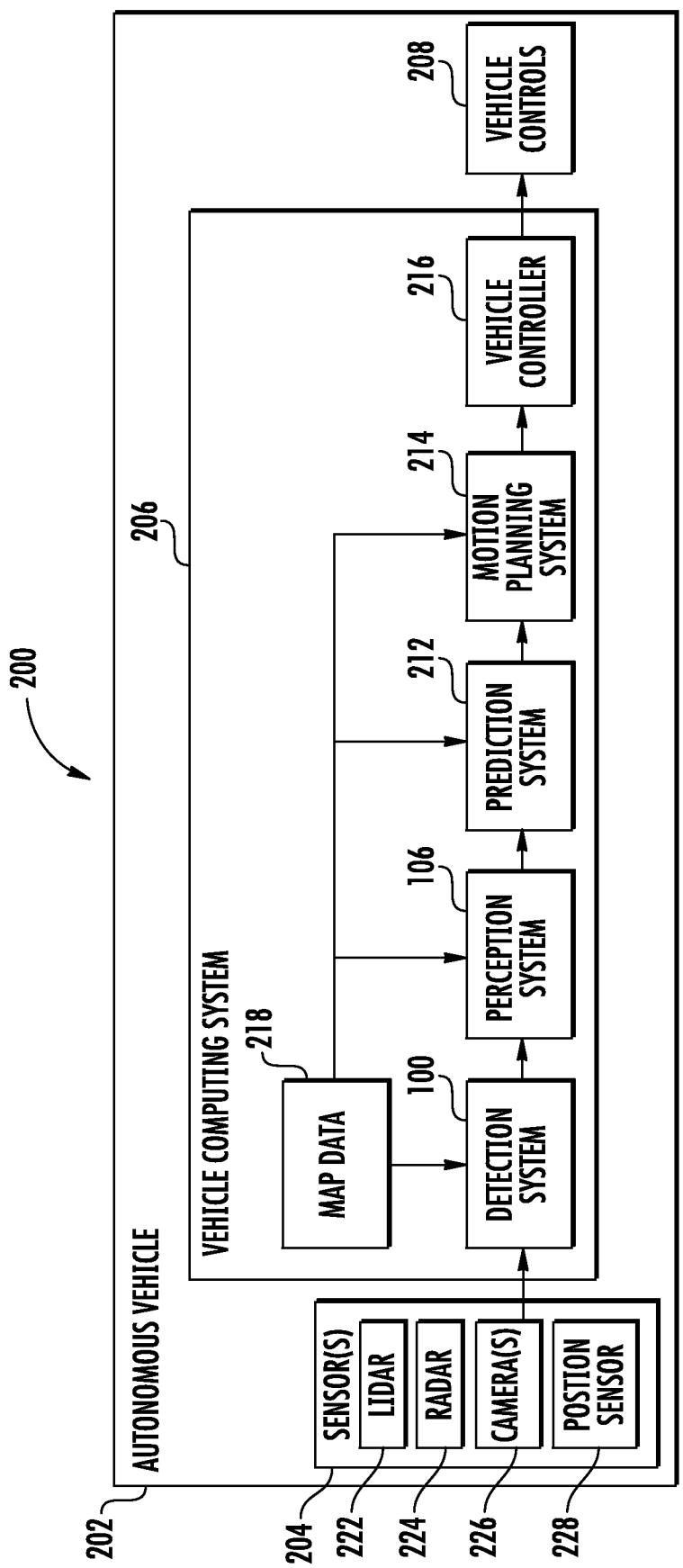
FIG. 3 depicts a block diagram of an example vehicle control system according to example embodiments of the present disclosure.

FIG. 3 depicts a block diagram of an example vehicle control system according to example embodiments of the present disclosure. More particularly, a vehicle control system 200 can be included within or otherwise associated with an autonomous vehicle 202. The autonomous vehicle 202 is capable of sensing its environment and navigating without human input. The autonomous vehicle 202 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 202 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 202 can include one or more sensors 204, a vehicle computing system 206, and one or more vehicle controls 208. The vehicle computing system 206 can include one or more computing devices configured to assist in controlling the autonomous vehicle 202. In particular, the vehicle computing system 206 can receive sensor data from the one or more sensors 204, attempt to comprehend the surrounding environment by performing various processing techniques on data collected by the sensors 204, and generate an appropriate motion path through such surrounding environment. The vehicle computing system 206 can control the one or more vehicle controls 208 to operate the autonomous vehicle 202 according to the motion path.

As illustrated in FIG. 3, in some embodiments, the vehicle computing system 206 can include a detection system 100 (e.g., as illustrated in FIG. 1), a perception system 106 (e.g., as illustrated in FIG. 1), a prediction system 212, and a motion planning system 214 that cooperate to perceive the surrounding environment of the autonomous vehicle 202 and determine a motion plan for controlling the motion of the autonomous vehicle 202 accordingly.

In particular, in some implementations, the perception system 106 can receive sensor data from the one or more sensors 204 that are coupled to or otherwise included within the autonomous vehicle 202. As examples, the one or more sensors 204 can include a Light Detection and Ranging (LIDAR) system 222, a Radio Detection and Ranging (RADAR) system 224, one or more cameras 226 (e.g., visible spectrum cameras, infrared cameras, etc.), one or more position sensors (e.g., a GPS system, a Galileo positioning system, the GLObal Navigation satellite system (GLONASS), the BeiDou Satellite Navigation and Positioning system, an inertial navigation system, a dead reckoning system) and/or other sensors. The sensor data can include information that describes the location of objects within the surrounding environment of the autonomous vehicle 202.

As one example, for LIDAR system 222, the sensor data can include the location (e.g., in three-dimensional space relative to the LIDAR system 222) of a number of points that correspond to objects that have reflected a ranging laser. For example, LIDAR system 222 can measure distances by measuring the Time of Flight (TOF) that it takes a short laser pulse to travel from the sensor to an object and back, calculating the distance from the known speed of light.

As another example, for RADAR system 224, the sensor data can include the location (e.g., in three-dimensional space relative to RADAR system 224) of a number of points that correspond to objects that have reflected a ranging radio wave. For example, radio waves (pulsed or continuous) transmitted by the RADAR system 224 can reflect off an object and return to a receiver of the RADAR system 224, giving information about the object's location and speed. Thus, RADAR system 224 can provide useful information about the current speed of an object.

As yet another example, for one or more cameras 226, various processing techniques can be performed to identify the location (e.g., in three-dimensional space relative to the one or more cameras 226) of a number of points that correspond to objects that are depicted in imagery captured by the one or more cameras 226.

As yet another example, position sensor 228 can determine or otherwise obtain position data for autonomous vehicle 202 by using one or more of inertial sensors, a satellite positioning system, based on IP address, by using triangulation and/or proximity to network access points or other network components (e.g., cellular towers, WiFi access points, etc.) and/or other suitable techniques.

Thus, the one or more sensors 204 can be used to collect sensor data that includes information that describes the location (e.g., in three-dimensional space relative to the autonomous vehicle 202) of points that correspond to objects within the surrounding environment of the autonomous vehicle 202.

In addition to the sensor data, the perception system 106 and other systems of vehicle computing system 206 can retrieve or otherwise obtain map data 218 that provides detailed information about the surrounding environment of the autonomous vehicle 202. The map data 218 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); the relative location of ground surfaces within map data; and/or any other map data that provides information that assists the vehicle computing system 206 in comprehending and perceiving its surrounding environment and its relationship thereto.

The perception system 106 can identify one or more objects that are proximate to the autonomous vehicle 202 based on sensor data received from the one or more sensors 204 and/or the map data 218. In particular, in some implementations, the perception system 106 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 106 can determine state data for each object over a number of iterations. In particular, the perception system 106 can update the state data for each object at each iteration. Thus, the perception system 106 can detect and track objects (e.g., vehicles, pedestrians, bicycles, and the like) that are proximate to the autonomous vehicle 202 over time.

The prediction system 212 can receive the state data from the perception system 106 and predict one or more future locations for each object based on such state data. For example, the prediction system 212 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 214 can determine a motion plan for the autonomous vehicle 202 based at least in part on the predicted one or more future locations for the object provided by the prediction system 212 and/or the state data for the object provided by the perception system 106. Stated differently, given information about the current locations of objects and/or predicted future locations of proximate objects, the motion planning system 214 can determine a motion plan for the autonomous vehicle 202 that best navigates the autonomous vehicle 202 relative to the objects at such locations.

As one example, in some implementations, the motion planning system 214 can determine a cost function for each of one or more candidate motion plans for the autonomous vehicle 202 based at least in part on the current locations and/or predicted future locations of the objects. For example, the cost function can describe a cost (e.g., over time) of adhering to a particular candidate motion plan. For example, the cost described by a cost function can increase when the autonomous vehicle 202 approaches a possible impact with another object and/or deviates from a preferred pathway (e.g., a preapproved pathway).

Thus, given information about the current locations and/or predicted future locations of objects, the motion planning system 214 can determine a cost of adhering to a particular candidate pathway. The motion planning system 214 can select or determine a motion plan for the autonomous vehicle 202 based at least in part on the cost function(s). For example, the candidate motion plan that minimizes the cost function can be selected or otherwise determined. The motion planning system 214 can provide the selected motion plan to a vehicle controller 216 that controls one or more vehicle controls 208 (e.g., actuators or other devices that control gas flow, acceleration, steering, braking, etc.) to execute the selected motion plan.

Each of the detection system 100, perception system 106, the prediction system 212, the motion planning system 214, and the vehicle controller 216 can include computer logic utilized to provide desired functionality. In some implementations, each of the detection system 100, the perception system 106, the prediction system 212, the motion planning system 214, and the vehicle controller 216 can be implemented in hardware, firmware, and/or software controlling a general purpose processor. For example, in some implementations, each of the detection system 100, perception system 106, the prediction system 212, the motion planning system 214, and the vehicle controller 216 includes program files stored on a storage device, loaded into a memory, and executed by one or more processors. In other implementations, each of the detection system 100, perception system 106, the prediction system 212, the motion planning system 214, and the vehicle controller 216 includes one or more sets of computer-executable instructions that are stored in a tangible computer-readable storage medium such as RAM hard disk or optical or magnetic media.

Figure 4:
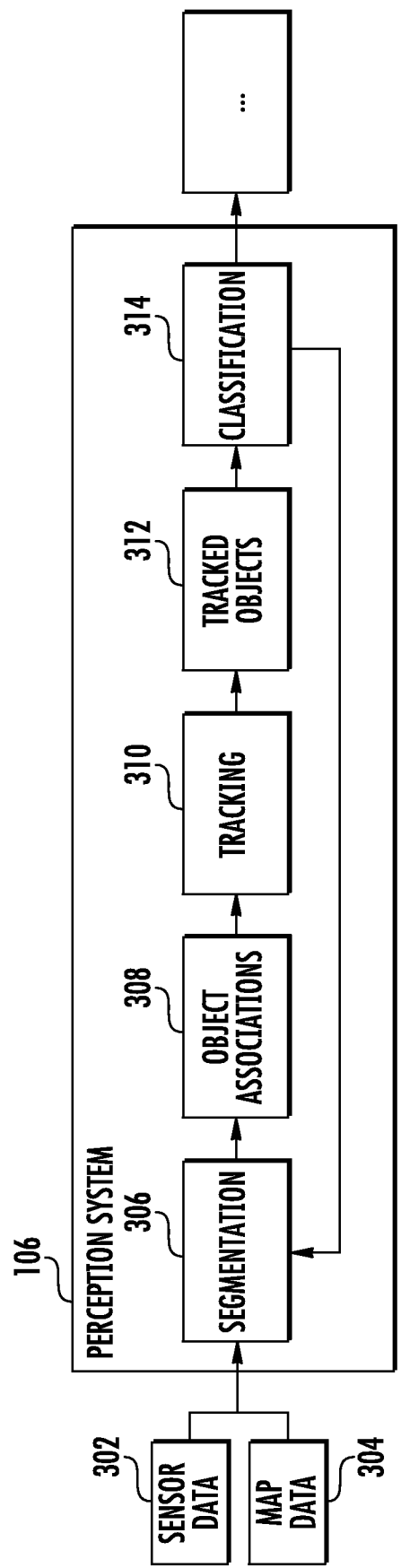
FIG. 4 depicts a block diagram of an example perception system according to example embodiments of the present disclosure.

FIG. 4 depicts a block diagram of more particular features associated with an example perception system 106 according to example embodiments of the present disclosure. As discussed in regard to FIG. 3, a vehicle computing system 206 can include a perception system 106 that can identify one or more objects that are proximate to an autonomous vehicle 202. In some embodiments, the perception system 106 can include segmentation component 306, object associations component 308, tracking component 310, tracked objects component 312, and classification component 314. The perception system 106 can receive sensor data 302 (e.g., from one or more sensor(s) 204 of the autonomous vehicle 202) and map data 304 (e.g., including map data 218 of FIG. 3) as input. The perception system 106 can use the sensor data 302 and the map data 304 in determining objects within the surrounding environment of the autonomous vehicle 202. In some embodiments, the perception system 106 iteratively processes the sensor data 302 to detect, track, and classify objects identified within the sensor data 302. In some examples, the map data 304 can help localize the sensor data to positional locations within a map or other reference system.

Within the perception system 106, the segmentation component 306 can process the received sensor data 302 and map data 304 to determine potential objects within the surrounding environment, for example using one or more object detection systems. The object associations component 308 can receive data about the determined objects and analyze prior object instance data to determine a most likely association of each determined object with a prior object instance, or in some cases, determine if the potential object is a new object instance. The tracking component 310 can determine the current state of each object instance, for example, in terms of its current position, velocity, acceleration, heading, orientation, uncertainties, and/or the like. The tracked objects component 312 can receive data regarding the object instances and their associated state data and determine object instances to be tracked by the perception system 106. The classification component 314 can receive the data from tracked objects component 312 and classify each of the object instances. For example, classification component 314 can classify a tracked object as an object from a predetermined set of objects (e.g., a vehicle, bicycle, pedestrian, etc.). The perception system 106 can provide the object and state data for use by various other systems within the vehicle computing system 206, such as the prediction system 212 of FIG. 3.

Figure 5:
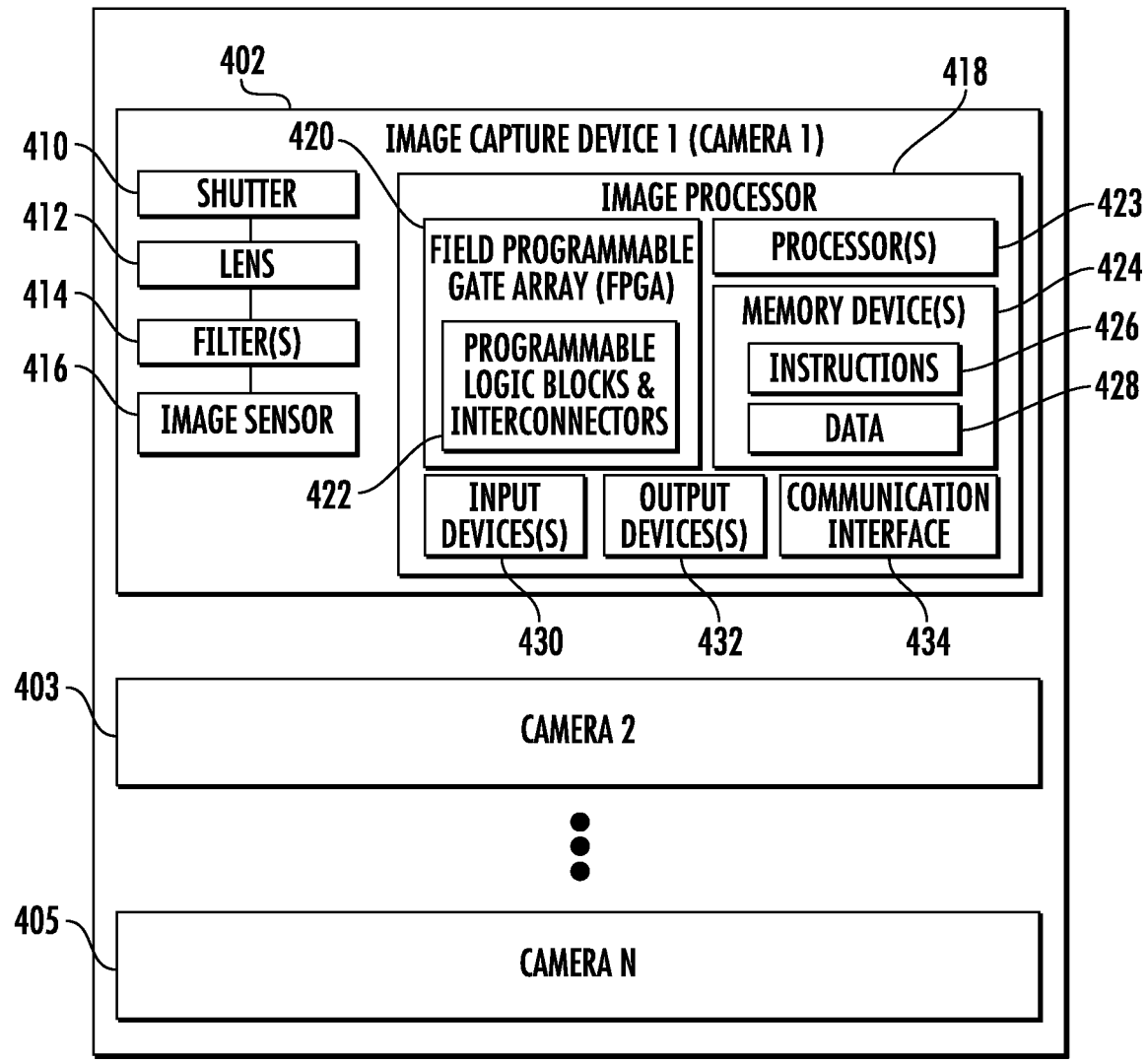
FIG. 5 depicts a block diagram of an example image processing system according to example embodiments of the present disclosure.

FIG. 5 depicts a block diagram of a camera system according to example embodiments of the present disclosure. In particular, FIG. 5 depicts an example embodiment of camera(s) 226 of a sensor system, such as sensor system including sensors 204 of FIG. 3, whereby camera(s) 226 can generate image data for use by a vehicle computing system in an autonomous vehicle, such as vehicle computing system 206 of FIG. 3, as discussed above. In some implementations, camera(s) 226 include a plurality of camera devices (e.g., image capture devices), such as camera 402, camera 403, and camera 405. Although only the components of camera 402 are discussed herein in further detail, it should be appreciated that cameras 2, . . . , N (e.g., camera 403 and camera 405) can include similar components as camera 402. In some implementations, the autonomous vehicle sensor system, such as sensors 204 of FIG. 3, may include at least four cameras, at least five cameras, at least six cameras, or more or less cameras depending on camera angular resolution, desired fields of view around a vehicle, etc.

Camera 402 can include a shutter 410, one or more lenses 412, one or more filters 414, and an image sensor 416. Camera 402 can also have additional conventional camera components not illustrated in FIG. 5 as would be understood by one of ordinary skill in the art. When shutter 410 of camera 402 is controlled to an open position, incoming light passes through lens(es) 412 and filter(s) 414 before reaching image sensor 416. Lens(es) 412 can be positioned before, between and/or after shutter 410 to focus images captured by camera 402. Camera 402 can obtain raw image capture data in accordance with a variety of shutter exposure protocols (e.g., a global shutter exposure protocol or a rolling shutter exposure protocol) by which shutter 410 is controlled to expose image sensor 416 to incoming light. Filter(s) 414 can include, for example, an infrared (IR) filter, a neutral density (NR) filter, an ultraviolet (UV) filter, a color filter array, or other filter type.

In some examples, the image sensor 416 can be a charge-coupled device (CCD) sensor or a complementary metal-oxide-semiconductor (CMOS) sensor, although other cameras can also be employed. Image sensor 416 can include an array of sensor elements corresponding to unique image pixels that are configured to detect incoming light provided incident to a surface of image sensor 416. Each sensor element within image sensor 416 can detect incoming light by detecting the amount of light that falls thereon and converting the received amount of light into a corresponding electric signal. The more light detected at each pixel, the stronger the electric signal generated by the sensor element corresponding to that pixel. In some examples, each sensor element within image sensor 416 can include a photodiode and an amplifier along with additional integrated circuit components configured to generate the electric signal representative of an amount of captured light at each camera element. The electric signals detected at image sensor 416 provide raw image capture data at a plurality of pixels, each pixel corresponding to a corresponding sensor element within image sensor 416. Camera 402 can be configured to capture successive full image frames of raw image capture data in successive increments of time.

As illustrated in FIG. 4, camera 402 also can include one or more image processing devices (e.g., image processors) 418 coupled to image sensor 416. In some examples, the one or more image processors 418 can include a field-programmable gate array (FPGA) device 420 provided within the camera 402. In some implementations, FPGA device 420 can correspond to or otherwise include one or more aspects described relative to FPGA device 130 of FIG. 2.

FPGA device 420 can include a plurality of programmable logic blocks and interconnectors 422. Specific configurations of the plurality of programmable logic blocks and interconnectors 422 can be selectively controlled to process raw image capture data received from image sensor 416. One or more image data links can be provided to couple the one or more image processors 418 to image sensor 416. In some examples, each image data link can be a high speed data link that can relay relatively large amounts of image data while consuming a relatively low amount of power. In some examples, image data link(s) can operate using different signaling protocols, including but not limited to a Low-Voltage Differential Signaling (LVDS) protocol, a lower voltage sub-LVDS protocol, a Camera Serial Interface (CSI) protocol using D-PHY and/or M-PHY physical layers, or other suitable protocols and interface layers.

The one or more image processors 418 can include one or more processor(s) 423 along with one or more memory device(s) 424 that can collectively function as respective computing devices. The one or more processor(s) 423 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), processing units performing other specialized calculations, etc. The one or more processor(s) 423 can be a single processor or a plurality of processors that are operatively and/or selectively connected.

The one or more memory device(s) 424 can include one or more non-transitory computer-readable storage media, such as RAM, ROM, EEPROM, EPROM, flash memory devices, magnetic disks, etc., and/or combinations thereof.

The one or more memory device(s) 424 can store information that can be accessed by the one or more processor(s) 423. For instance, the one or more memory device(s) 424 can include computer-readable instructions 426 that can be executed by the one or more processor(s) 423. The instructions 426 can be software written in any suitable programming language, firmware implemented with various controllable logic devices, and/or can be implemented in hardware. Additionally, and/or alternatively, the instructions 426 can be executed in logically and/or virtually separate threads on processor(s) 423. The instructions 426 can be any set of instructions that when executed by the one or more processor(s) 423 cause the one or more processor(s) 423 to perform operations.

The one or more memory device(s) 424 can store data 428 that can be retrieved, manipulated, created, and/or stored by the one or more processor(s) 423. The data 428 can include, for instance, raw image capture data, digital image outputs, or other image-related data or parameters. The data 428 can be stored in one or more database(s). The one or more database(s) can be split up so that they can be provided in multiple locations.

Camera 402 can include a communication interface 434 used to communicate with one or more other component(s) of a sensor system or other systems of an autonomous vehicle, for example, a vehicle computing system such as vehicle computing system 206 of FIG. 3. The communication interface 434 can include any suitable components for interfacing with one or more communication channels, including for example, transmitters, receivers, ports, controllers, antennas, or other suitable hardware and/or software. A communication channel can be any type of communication channel, such one or more data bus(es) (e.g., controller area network (CAN)), an on-board diagnostics connector (e.g., OBD-II) and/or a combination of wired and/or wireless communication links for sending and/or receiving data, messages, signals, etc. among devices/systems. A communication channel can additionally or alternatively include one or more networks, such as a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the camera 402 and/or other local autonomous vehicle systems or associated server-based processing or control systems located remotely from an autonomous vehicle. The communication channel can include a direct connection between one or more components. In general, communication using communication channels and/or among one or more component(s) can be carried via communication interface 434 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Camera 402 also can include one or more input devices 430 and/or one or more output devices 432. An input device 430 can include, for example, devices for receiving information from a user, such as a touch screen, touch pad, mouse, data entry keys, speakers, a microphone suitable for voice recognition, etc. An input device 430 can be used, for example, by a user or accessible computing device to select controllable inputs for operation of the camera 402 (e.g., shutter, ISO, white balance, focus, exposure, etc.) and or control of one or more parameters. An output device 432 can be used, for example, to provide digital image outputs to a vehicle operator. For example, an output device 432 can include a display device (e.g., display screen, CRT, LCD), which can include hardware for displaying an image or other communication to a user. Additionally, and/or alternatively, output device(s) can include an audio output device (e.g., speaker) and/or device for providing haptic feedback (e.g., vibration).

Figure 6:
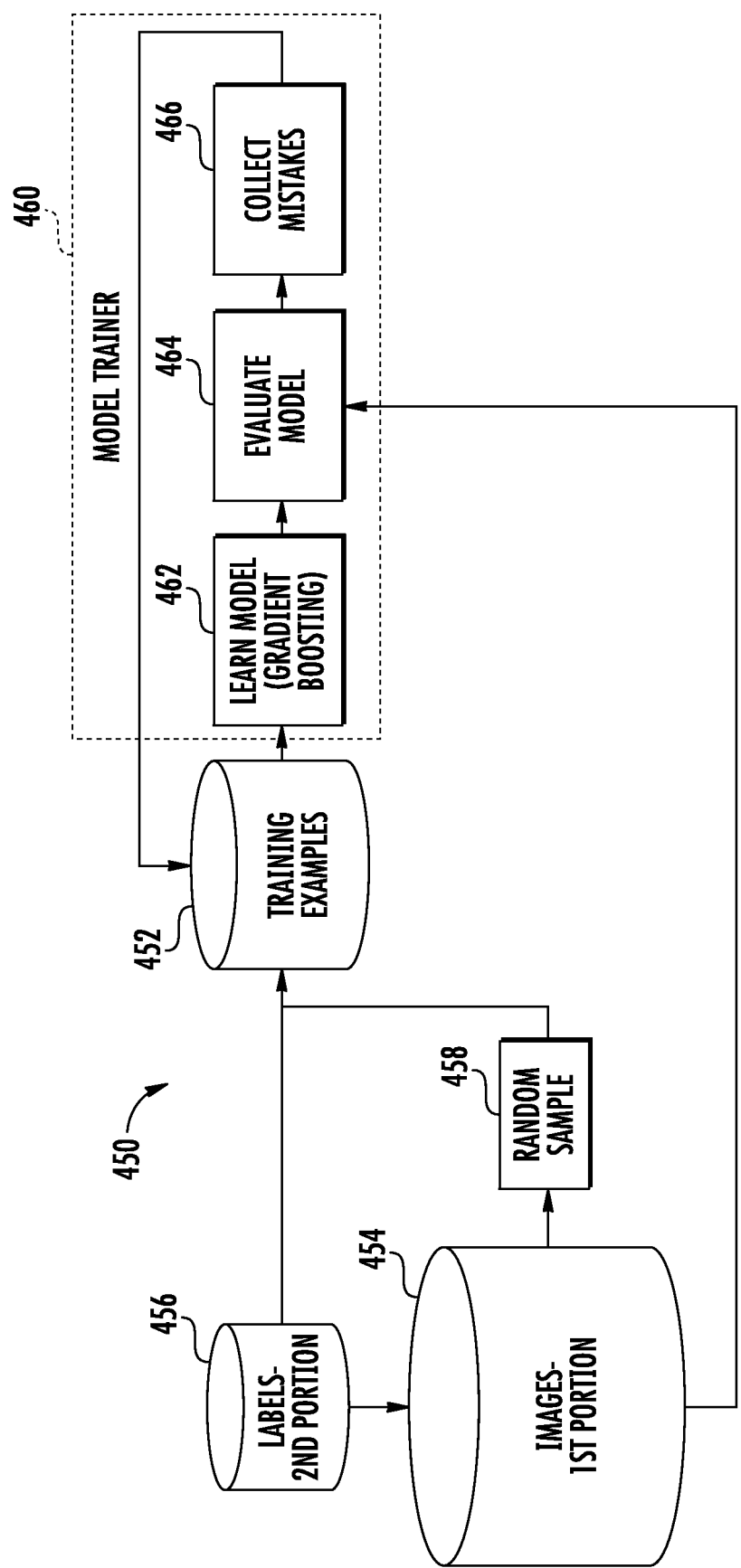
FIG. 6 depicts a block diagram of an example training system for a classification model according to example embodiments of the present disclosure.

FIG. 6 depicts a block diagram of a training system for a classification model according to example embodiments of the present disclosure. For example, a training system 450 can be used to help train a classification model such as classification model 118 of FIG. 1 or classification model 160 of FIG. 2. In particular, training system 450 can include a set of training data 452 that is provided to a model trainer 460. Training data 452 can include, for example, a plurality of sets of example ground truth data, each set of ground truth data including a first data portion 454 and a second data portion 456. The first data portion 454 of ground truth data can include an example set of one or more image regions, while the second data portion 456 of ground truth data can correspond to labels indicating a class prediction (e.g., an indication that an image region includes or does not include one or more classes of objects) that is manually and/or automatically labeled as correct or incorrect. In some implementations, a random sample 458 of the first data portion 454 of example image data and corresponding labels from second data portion 456 can be obtained to create a corpus of training data examples having a manageable size.

The model trainer 460 can train a classification model, for example, by using one or more sets of ground truth data in the set of training data 452. In some implementations, a model learning component 462 within model trainer 460 can employ ground-truth data provided within training examples 452 to generate an initial model. This initial model can then be further evaluated and refined by model evaluation component 464. In some implementations, model evaluation component 464 employs ground-truth data from some or all of the ground-truth data provided by first data portion 454 and second data portion 456 as opposed to just the random sample 458 used by model learning component 462. For each set of ground truth data including a first data portion 454 (e.g., an image region) and second data portion 456 (e.g., a class prediction label), one or more components within model trainer 460 can provide the first data portion 454 as input into the classification model and receive at least one class prediction as an output of the classification model.

Model evaluation component 464 within model trainer 460 can evaluate an objective function that describes a difference between the at least one class prediction received as an output of the classification model(s) and the second data portion 456 of the set of ground truth data. The model trainer 460 can train the classification model(s) based at least in part on the objective function. As one example, gradient boosting can be used as a training technique within model learning component 462, such as when the classification model is a decision tree classifier such as boosted random forest classifier. As another example, in some implementations, the objective function can be backpropagated through a machine-learned classification model at model learning component 462 to train the classification model when it is a machine-learned model such as a neural network, support vector machine (SVM) or other machine-learned model.

Model evaluation component 464 and mistake collection component 466 can function together to implement a hard negative mining system to further enhance the model trainer 460. More particularly, model evaluation component 464 can identify negative training instances in which the classification model incorrectly predicted that an image region included a detected object. These negative training instances can then be gathered at mistake collection component 466 and fed back into the corpus of training data 452. The classification model can then be retrained with the updated set of training data 452 that includes negative training instances so that the classification model can be further refined to more accurately predict when an image region includes or does not include one or more categories of detected objects.

In such fashion, classification model(s) as described herein can be trained to provide a correct class prediction on the receipt of one or more image regions generated from camera image data. The model trainer 460 and other components of training system 450 can be implemented in hardware, firmware, and/or software controlling one or more processors.

Figure 7:
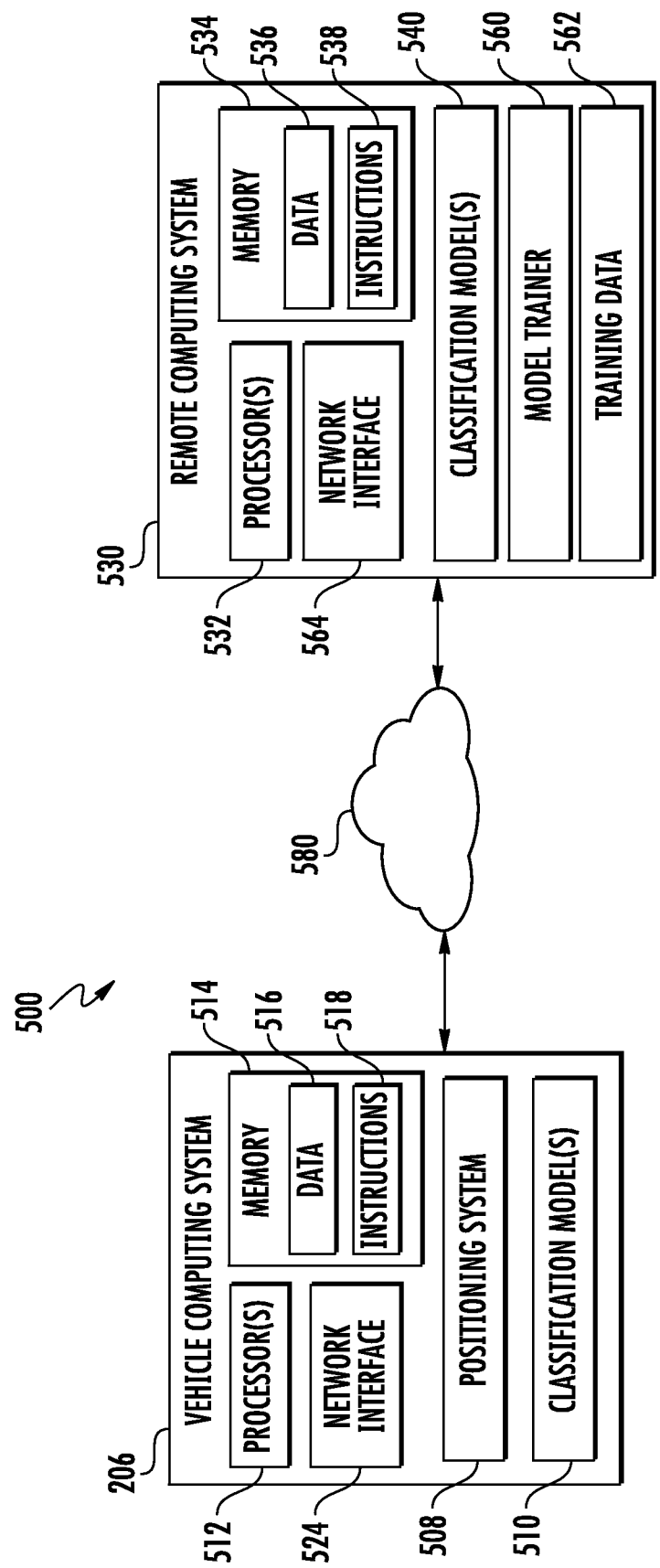
FIG. 7 depicts a block diagram of an example computing system according to example embodiments of the present disclosure.

FIG. 7 depicts a block diagram of an example computing system 500 according to example embodiments of the present disclosure. The example computing system 500 can include a vehicle computing system (e.g., vehicle computing system 206 of FIG. 3) and a remote computing system 530 that are communicatively coupled over a network 580. Remote computing system 530 can include one or more remote computing device(s) that are remote from the autonomous vehicle 202. The remote computing system 530 can be associated with a central operations system and/or an entity associated with the autonomous vehicle 202 such as, for example, a vehicle owner, vehicle manager, fleet operator, service provider, etc.

In some implementations, the vehicle computing system 206 can perform autonomous vehicle motion planning including object detection, tracking, and/or classification (e.g., making object class predictions and object location/orientation estimations as described herein). In some implementations, the vehicle computing system 206 can be included in an autonomous vehicle. For example, the vehicle computing system 206 can be on-board the autonomous vehicle. In other implementations, the vehicle computing system 206 is not located on-board the autonomous vehicle. For example, the vehicle computing system 206 can operate offline to perform image processing, object detection, and other tasks as described herein. The vehicle computing system 206 can include one or more distinct physical computing devices.

The vehicle computing system 206 can include one or more computing devices embodied by one or more processors 512 and a memory 514. The one or more processors 512 can be any suitable processing device (e.g., a processor core, a microprocessor, an ASIC, a FPGA, a controller, a microcontroller, etc.) and can be one processor or a plurality of processors that are operatively connected. The memory 514 can include one or more non-transitory computer-readable storage media, such as RAM, ROM, EEPROM, EPROM, one or more memory devices, flash memory devices, etc., and combinations thereof.

The memory 514 can store information that can be accessed by the one or more processors 512. For instance, the memory 514 (e.g., one or more non-transitory computer-readable storage mediums, memory devices) can store data 516 that can be obtained, received, accessed, written, manipulated, created, and/or stored. The data 516 can include, for instance, LIDAR data obtained by LIDAR system 222 and/or RADAR data obtained by RADAR system 224, image data obtained by camera(s) 226, data identifying detected and/or classified objects including current object states and predicted object locations and/or trajectories, motion plans, classification models, rules, etc. as described herein. In some implementations, the vehicle computing system 206 can obtain data from one or more memory device(s) that are remote from the vehicle computing system 206.

The memory 514 can also store computer-readable instructions 518 that can be executed by the one or more processors 512. The instructions 518 can be software written in any suitable programming language or can be implemented in hardware. Additionally, or alternatively, the instructions 518 can be executed in logically and/or virtually separate threads on processor(s) 512.

Figure 19:
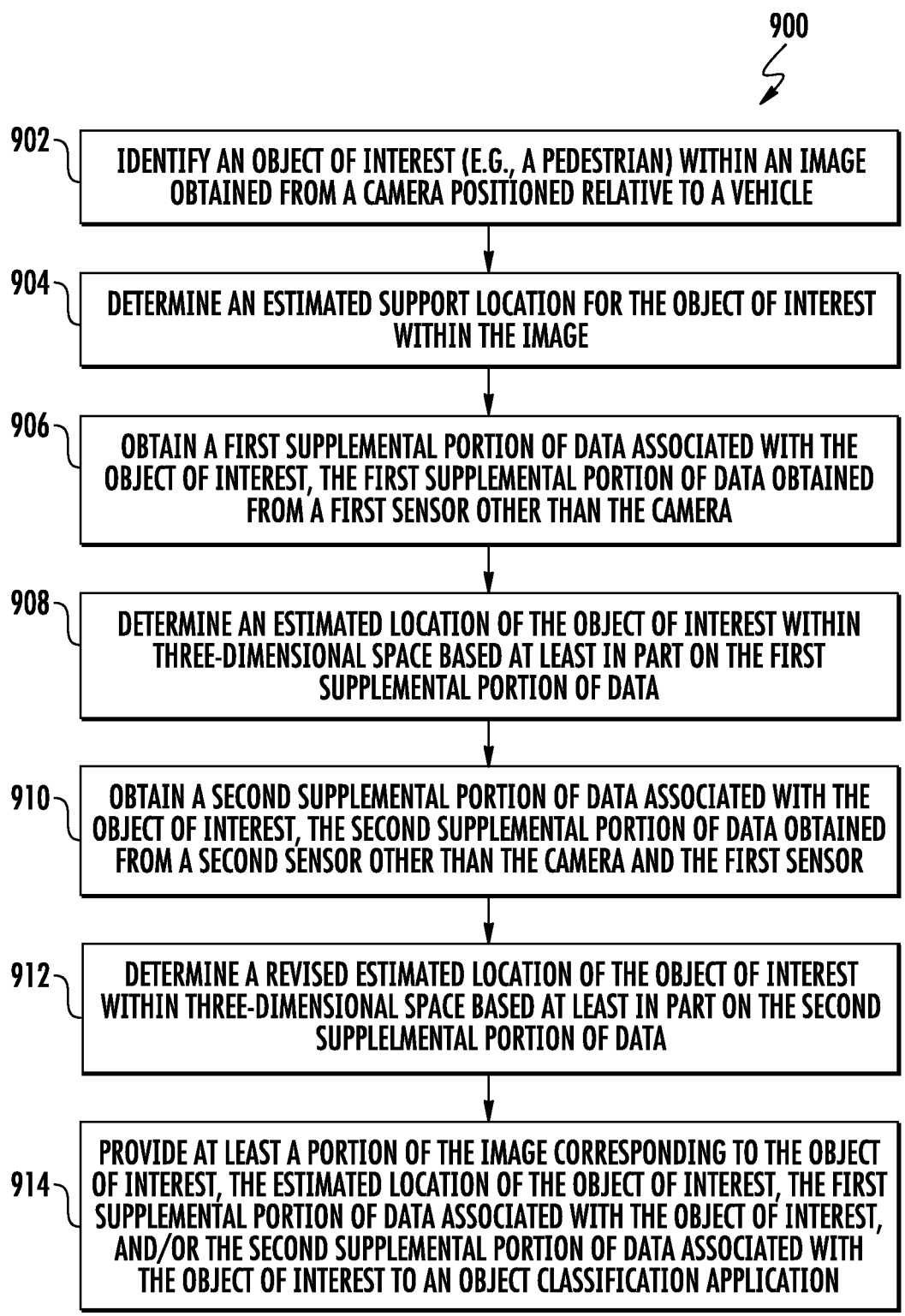
FIG. 19 depicts a flow diagram of an example method for detecting objects of interest according to example embodiments of the present disclosure.
Figure 20:
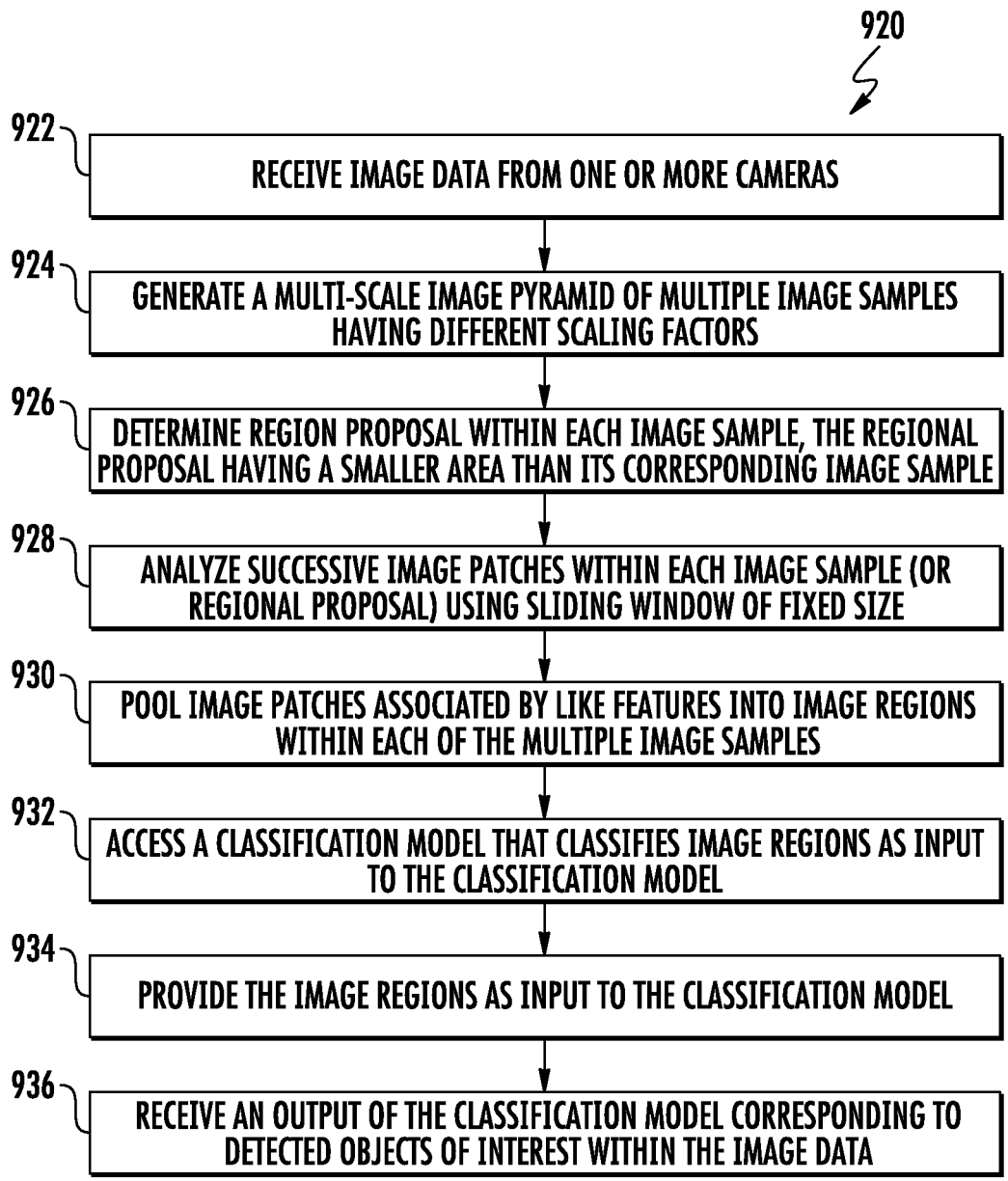
FIG. 20 depicts a flow diagram of an example method for identifying an object of interest within an image according to example embodiments of the present disclosure.

For example, the memory 514 can store instructions 518 that when executed by the one or more processors 512 cause the one or more processors 512 to perform any of the operations and/or functions described herein, including, for example, operations 902-914 of FIG. 19 and/or operations 922-936 of FIG. 20.

In some implementations, the vehicle computing system 206 can further include a positioning system 508. The positioning system 508 can determine a current position of the autonomous vehicle 202. The positioning system 508 can be any device or circuitry for analyzing the position of the autonomous vehicle 202. For example, the positioning system 508 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 202 can be used by various systems of the vehicle computing system 206.

According to an aspect of the present disclosure, the vehicle computing system 206 can store or include one or more classification models 510. As examples, the classification model(s) 510 can be or can otherwise include various models trained by supervised learning and/or machine learning such as, for example, classification model 118 of FIG. 1 or classification model 160 of FIG. 2. Classification model 510 can include one or more neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the vehicle computing system 206 can receive the one or more classification models 510 from the remote computing system 530 over network 580 and can store the one or more classification models 510 in the memory 514. The vehicle computing system 206 can then use or otherwise implement the one or more classification models 510 (e.g., by processor(s) 512). In particular, the vehicle computing system 206 can implement the classification model(s) 510 to perform object detection including making object class predictions. For example, in some implementations, the vehicle computing system 206 can employ the classification model(s) 510 by inputting one or more image regions into the classification model(s) 510 and receiving an output of the classification model 510 including a determination of whether the image region does or does not include a detected object, as well as an optional classification of detected objects and/or confidence score indicating the likelihood of accuracy for a detection determination and/or object class prediction.

The remote computing system 530 can include one or more computing devices embodied by one or more processors 532 and a memory 534. The one or more processors 532 can be any suitable processing device (e.g., a processor core, a microprocessor, an ASIC, a FPGA, a controller, a microcontroller, etc.) and can be one processor or a plurality of processors that are operatively connected. The memory 534 can include one or more non-transitory computer-readable storage media, such as RAM, ROM, EEPROM, EPROM, one or more memory devices, flash memory devices, etc., and combinations thereof.

The memory 534 can store information that can be accessed by the one or more processors 532. For instance, the memory 534 (e.g., one or more non-transitory computer-readable storage mediums, memory devices) can store data 536 that can be obtained, received, accessed, written, manipulated, created, and/or stored. The data 536 can include, for instance, ranging data, image data, data identifying detected and/or classified objects including current object states and predicted object locations and/or trajectories, motion plans, machine-learned models, rules, etc. as described herein. In some implementations, the remote computing system 530 can obtain data from one or more memory device(s) that are remote from the remote computing system 530.

The memory 534 can also store computer-readable instructions 538 that can be executed by the one or more processors 532. The instructions 538 can be software written in any suitable programming language or can be implemented in hardware. Additionally, or alternatively, the instructions 538 can be executed in logically and/or virtually separate threads on processor(s) 532.

Figure 11:
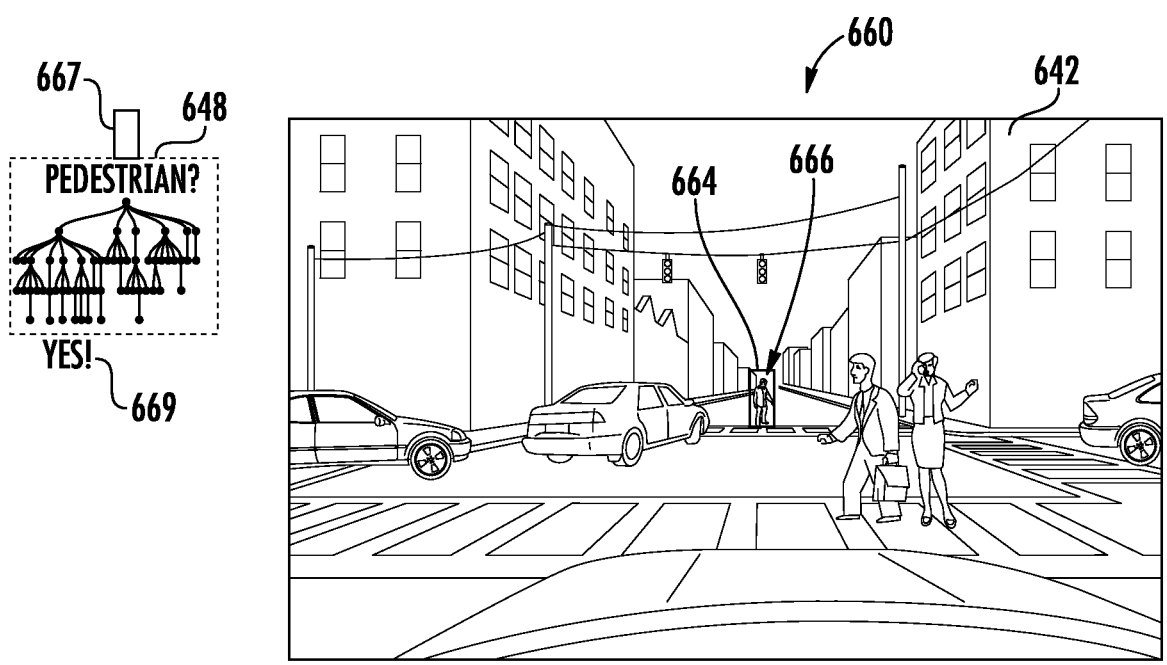
FIG. 11 depicts a third example aspect of sliding window image analysis according to example embodiments of the present disclosure.

For example, the memory 534 can store instructions 538 that when executed by the one or more processors 532 cause the one or more processors 532 to perform any of the operations and/or functions described herein, including, for example, operations 702-714 of FIG. 11.

In some implementations, the remote computing system 530 includes one or more server computing devices. If the remote computing system 530 includes multiple server computing devices, such server computing devices can operate according to various computing architectures, including, for example, sequential computing architectures, parallel computing architectures, or some combination thereof.

In addition or alternatively to the classification model(s) 510 at the vehicle computing system 206, the remote computing system 530 can include one or more classification models 540. As examples, the classification model(s) 540 can be or can otherwise include various model(s) trained by supervised learning and/or machine learning such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, the remote computing system 530 can communicate with the vehicle computing system 206 according to a client-server relationship. For example, the remote computing system 530 can implement the classification model(s) 540 to provide a web service to the vehicle computing system 206. For example, the web service can provide an autonomous vehicle motion planning service.

Thus, classification model(s) 510 can be located and used at the vehicle computing system 206 and/or classification model(s) 540 can be located and used at the remote computing system 530.

In some implementations, the remote computing system 530 and/or the vehicle computing system 206 can train the classification model(s) 510 and/or 540 through use of a model trainer 560 that has access to a set of training data 562. In some implementations, model trainer 560 and training data 562 of FIG. 7 can correspond to or otherwise include features of model trainer 460 and training data 452 of FIG. 6. The model trainer 560 can train the classification model(s) 510 and/or 540 using one or more training or learning algorithms. In some implementations, the model trainer 560 can perform supervised training techniques using a set of labeled training data. In other implementations, the model trainer 560 can perform unsupervised training techniques using a set of unlabeled training data. The model trainer 560 can perform a number of generalization techniques to improve the generalization capability of the models being trained. Generalization techniques include weight decays, dropouts, pruning, or other techniques.

The vehicle computing system 206 can also include a network interface 524 used to communicate with one or more systems or devices, including systems or devices that are remotely located from the vehicle computing system 206. The network interface 524 can include any circuits, components, software, etc. for communicating with one or more networks (e.g., 580). In some implementations, the network interface 524 can include, for example, one or more of a communications controller, receiver, transceiver, transmitter, port, conductors, software, and/or hardware for communicating data. Similarly, the remote computing system 530 can include a network interface 564.

The network(s) 580 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof and can include any number of wired or wireless links. Communication over the network(s) 580 can be accomplished, for instance, via a network interface using any type of protocol, protection scheme, encoding, format, packaging, etc.

FIG. 7 illustrates one example computing system 500 that can be used to implement the present disclosure. Other computing systems can be used as well. For example, in some implementations, the vehicle computing system 206 can include the model trainer 560 and the training data 562. In such implementations, the classification model(s) 510 can be both trained and used locally at the vehicle computing system 206. As another example, in some implementations, the vehicle computing system 206 is not connected to other computing systems.

In addition, components illustrated and/or discussed as being included in one of the computing systems 206 or 530 can instead be included in another of the computing systems 206 or 530. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Figure 8:
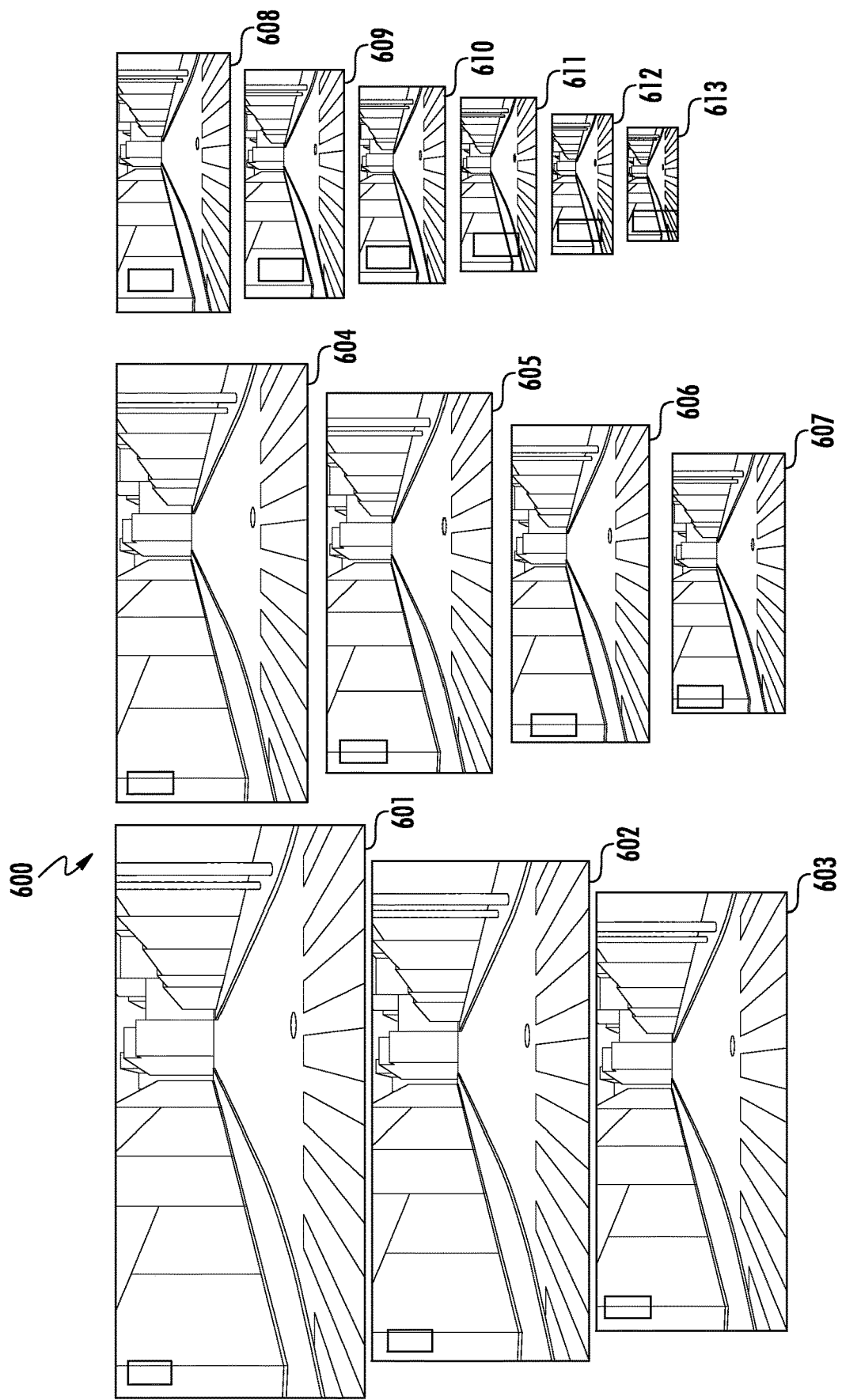
FIG. 8 depicts an example multi-scale image pyramid according to example embodiments of the present disclosure.

FIG. 8 depicts an example multi-scale image pyramid 600 according to example embodiments of the present disclosure. For example, a multi-scale image pyramid 600 can include multiple image samples (e.g., image samples 601-613) that are created by resizing image data (e.g., image data 102) into multiple image samples having different sampling ratios. Resizing to create a multi-scale image pyramid can be implemented, for example, by resizing component 147 of FPGA device 130 in FIG. 2. In some implementations, for example, image resizing can include downsampling the image data 102 into multiple image samples forming the multi-scale image pyramid 600. The multi-scale image pyramid 600 can include image data that is translated into multiple image samples 601-613, each having a different scaling factor. In some implementations, the multi-scale image pyramid 600 can be characterized by a number of octaves (e.g., powers of two) and a number of scales per octave. Although FIG. 8 depicts multi-scale image pyramid 600 as including 13 different image samples, it should be appreciated that any number of image samples can be generated in accordance with embodiments of the disclosed technology. In some implementations, for example, a multi-scale image pyramid is generated having 3 octaves and 3 scales for a total of $2^3*3=24$ scales.

FIGS. 9-12 depict exemplary aspects of sliding window image analysis according to example embodiments of the present disclosure. For example, FIGS. 9-12 depict successive iterations 640, 650, 660 and 670 of analyzing an example image sample 642 using a sliding window 644 having a fixed predetermined size. Image sample 642 can correspond, for example, to one of the image samples created when generating a multi-scale image pyramid such as depicted in FIG. 8.

Figure 9:
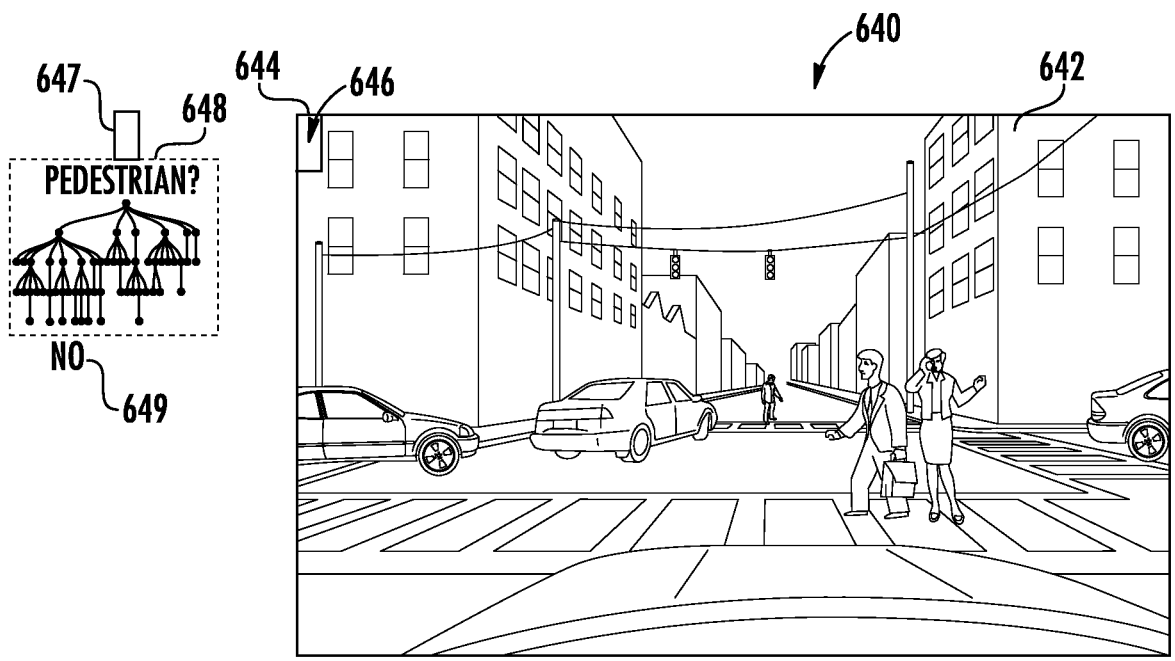
FIG. 9 depicts a first example aspect of sliding window image analysis according to example embodiments of the present disclosure.

In first iteration 640 of FIG. 9, sliding window 644 is positioned at a first position 646 within image sample 642. In some implementations, first position 646 can correspond to a start position for analyzing successive patches within the image sample 642. Although first position 646 is depicted in the upper left corner of image sample 642, it should be appreciated that a start position (e.g., first position 646) can correspond to one of the other corners of image sample 642 and/or another predetermined location within image sample 642 including a predetermined location relative to a subset of each image sample 642. An image patch 647 can be identified within sliding window 644 at first position 646 and provided as an input to a classification model 648. Classification model 648 can correspond, for example, to classification model 118 of FIG. 1, classification model 160 of FIG. 2, or classification model 510 or 540 of FIG. 7. The classification model 648 depicted in FIGS. 9-12 can have been trained to output a pedestrian classification prediction that determines whether image patch 647 includes or does not include a pedestrian. When image patch 647 is provided as input to classification model 648, a "NO" output 649 can be received indicating that image patch 647 does not include a pedestrian. Although FIGS. 9-12 depict an example classification prediction for pedestrians, other classifications can additionally or alternatively be determined.

Figure 10:
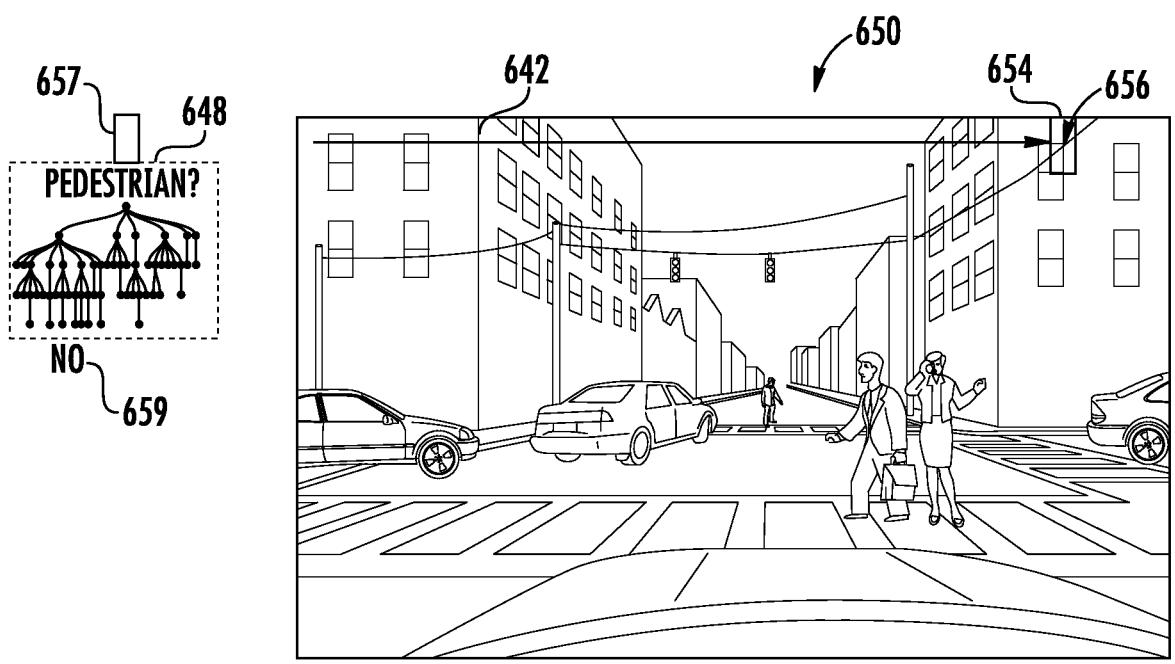
FIG. 10 depicts a second example aspect of sliding window image analysis according to example embodiments of the present disclosure.

In second iteration 650 of FIG. 10, sliding window 654 is positioned at a second position 656 within image sample 642. In some implementations, second position 656 can correspond to a position translated in a given direction relative to a start position (e.g., first position 646 of FIG. 9). For instance, second position 656 corresponds to a position translated horizontally relative to first position 646. It should be appreciated that multiple positions of sliding window 654 can be implemented between the first position 646 of FIG. 9 and the second position 656 of FIG. 10. As such, although the position of sliding window 644/654 in FIGS. 9 and 10 are described as a first position 646 and second position 656, the first and second positions 646, 656 are not necessarily consecutive.

Referring still to FIG. 10, an image patch 657 can be identified within sliding window 654 at second position 656 and provided as an input to classification model 648. When image patch 657 is provided as input to classification model 648, a "NO" output 659 can be received indicating that image patch 657 does not include a pedestrian. Successive image patches between image patch 647 and image patch 657 as sliding window 644/654 transitions from the first position 646 depicted in FIG. 9 to the second position 656 depicted in FIG. 10 can also be provided as input to classification model 648, with corresponding outputs received therefrom.

In third iteration 660 of FIG. 11, sliding window 664 is positioned at a third position 666 within image sample 642. It should be appreciated that multiple positions of sliding window 664 can be implemented between the second position 656 of FIG. 10 and the third position 666 of FIG. 11. As such, although the position of sliding window 654/664 in FIGS. 10 and 11 are described as a second position 656 and third position 666, the second and third positions 656, 666 are not necessarily consecutive. An image patch 667 can be identified within sliding window 664 at third position 666 and provided as an input to classification model 648. When image patch 667 is provided as input to classification model 648, a "YES" output 669 can be received indicating that image patch 667 does include a pedestrian. Successive image patches between image patch 657 and image patch 667 as sliding window 654/664 transitions from the second position 656 depicted in FIG. 10 to the third position 666 depicted in FIG. 11 can also be provided as input to classification model 648, with corresponding outputs received therefrom.

Figure 12:
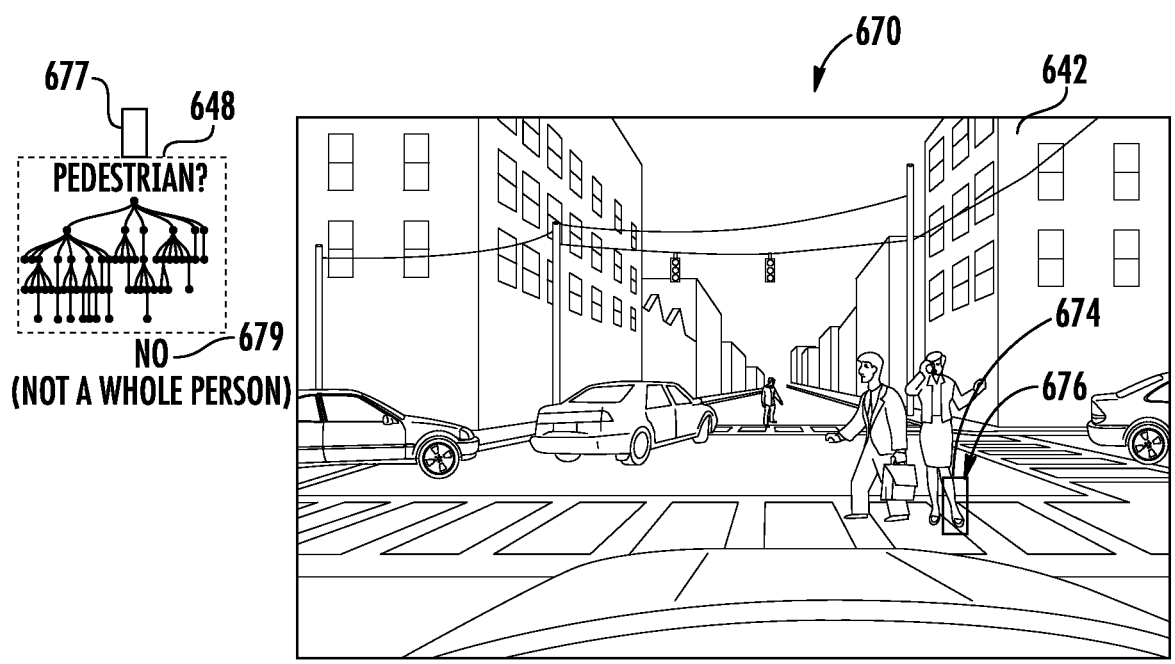
FIG. 12 depicts a fourth example aspect of sliding window image analysis according to example embodiments of the present disclosure.

In fourth iteration 670 of FIG. 12, sliding window 674 is positioned at a fourth position 676 within image sample 642. It should be appreciated that multiple positions of sliding window 664/674 can be implemented between the third position 666 of FIG. 11 and the fourth position 676 of FIG. 12. As such, although the position of sliding window 664/674 in FIGS. 11 and 12 are described as a third position 666 and fourth position 676, the third and fourth positions 666, 676 are not necessarily consecutive. An image patch 677 can be identified within sliding window 674 at fourth position 676 and provided as an input to classification model 648. In addition, successive image patches between image patch 667 and image patch 677 as sliding window 664/674 transitions from the third position 666 depicted in FIG. 11 to the fourth position 676 depicted in FIG. 12 can also be provided as input to classification model 648, with corresponding outputs received therefrom.

Referring still to FIG. 12, when image patch 677 is provided as input to classification model 648, a "NO" output 679 can be received indicating that image patch 677 does not include a pedestrian. Although image patch 677 includes a portion of a pedestrian (e.g., a leg), the pedestrian may not be recognized by classification model 648 until an image patch containing a larger portion or entirety of the pedestrian is provided as input to classification model 648. This is why multiple image samples having different scales are analyzed using a sliding window 644/654/664/674 of fixed size. In this manner, objects only partially captured within sliding window 644/654/664/674 in some image samples can be fully captured within sliding window 644/654/664/674 in one or more other image samples.

FIGS. 13-17 depict example aspects of region proposal determination within an image sample according to example aspects of the present disclosure. In general, the region proposal techniques depicted in FIGS. 13-17 can help identify pedestrians or other categories of objects of interest within image data obtained from a camera positioned relative to a vehicle. Region proposals can generally have a smaller area than the image itself so that by determining region proposals within an image, the sliding window analysis depicted in FIGS. 9-12 can be conducted over a smaller image subset, thereby reducing total image processing time and resources for object detection.

Figure 13:
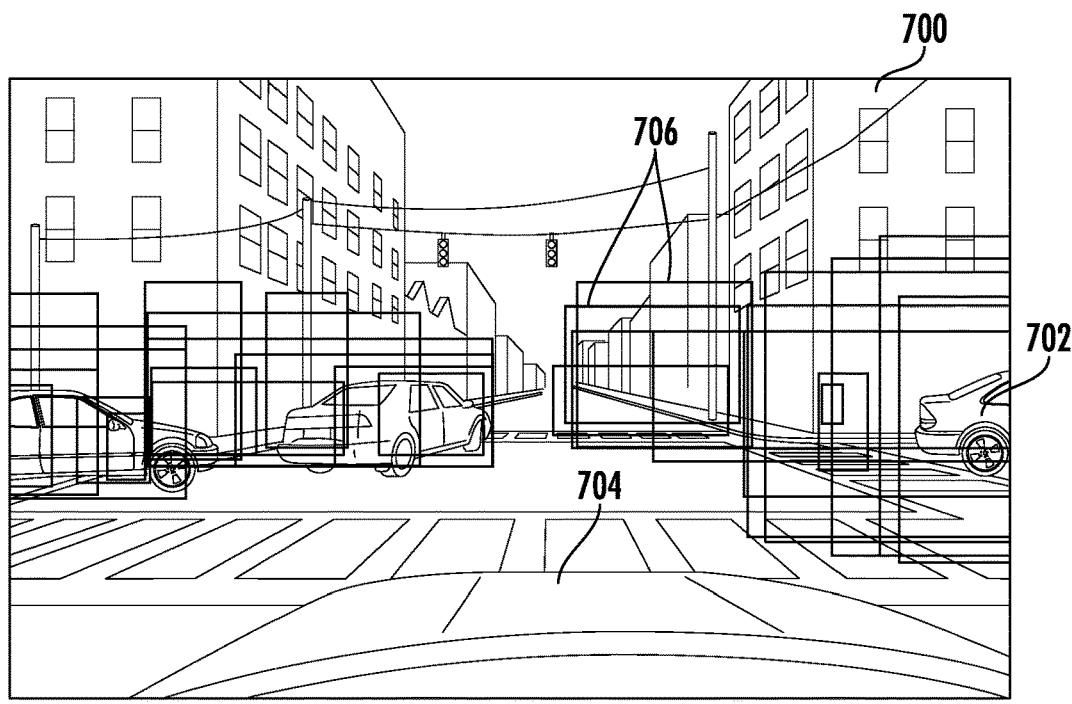
FIG. 13 depicts a first example aspect of region proposal determination within an image sample according to example aspects of the present disclosure.

With more particular reference to FIG. 13, one or more region proposals can be determined for an image based at least in part on information determined from LIDAR data corresponding to image data in a particular scene. FIG. 13 depicts image data 700 that is overlaid with a point cloud 702 of LIDAR data points that are obtained in a same geographic area surrounding an autonomous vehicle 704 in the image data 700. The point cloud 702 depicted in FIG. 13 illustrates LIDAR data that is obtained by a LIDAR sensor such as one included in LIDAR system 222 of FIG. 2. In some implementations, point cloud 702 illustrates LIDAR data after application of an LBS filter. LBS filter serves to remove LIDAR data points corresponding to background objects (e.g., ground, sky, buildings, etc.) and retain LIDAR data points corresponding to foreground objects, which are more likely to include objects of interest such as pedestrians, bicycles, vehicles, etc.

Referring still to FIG. 13, region proposals 706 can be generated by analyzing the height and range of LIDAR data points within point cloud 702. Region proposals 706 can thus be determined at least in part from locations within the image data 700 corresponding to locations for which corresponding LIDAR point data 702 is also obtained. In addition, region proposals 706 can be determined at least in part from locations within the image data 700 determined to correspond to foreground as opposed to background. In the example of FIG. 13, the portion of image data identified by region proposals 706 can reduce the total amount of image data for subsequent object detection analysis by at least one order of magnitude (e.g., a factor of ten) compared with the entirety of image data 700.

Figure 14:
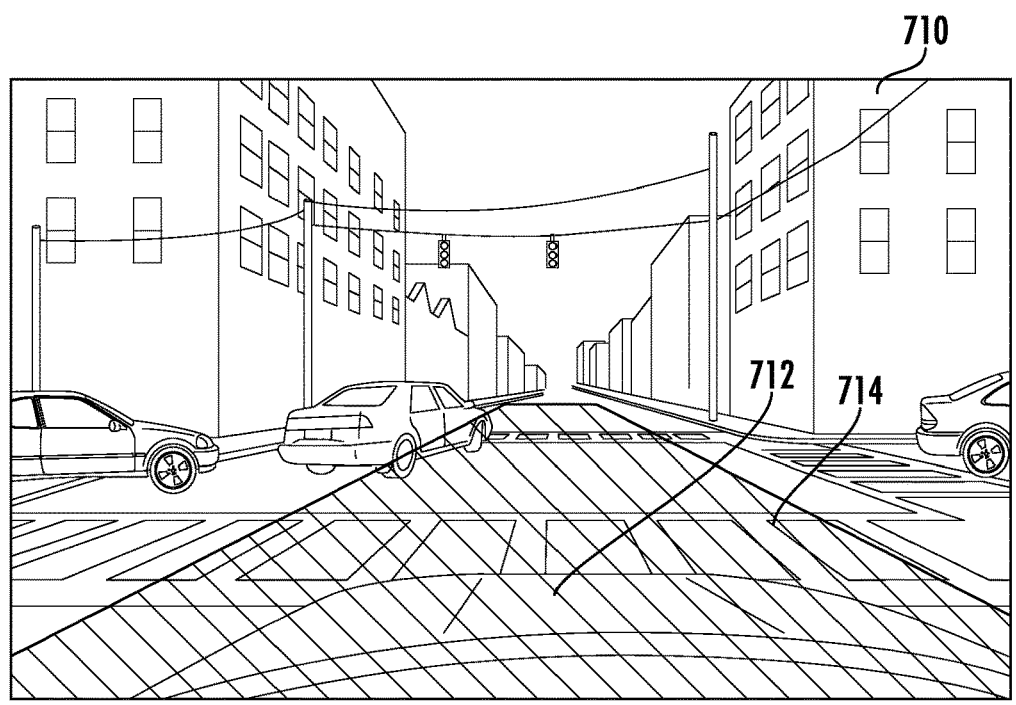
FIG. 14 depicts a second example aspect of region proposal determination within an image sample according to example aspects of the present disclosure.
Figure 15:
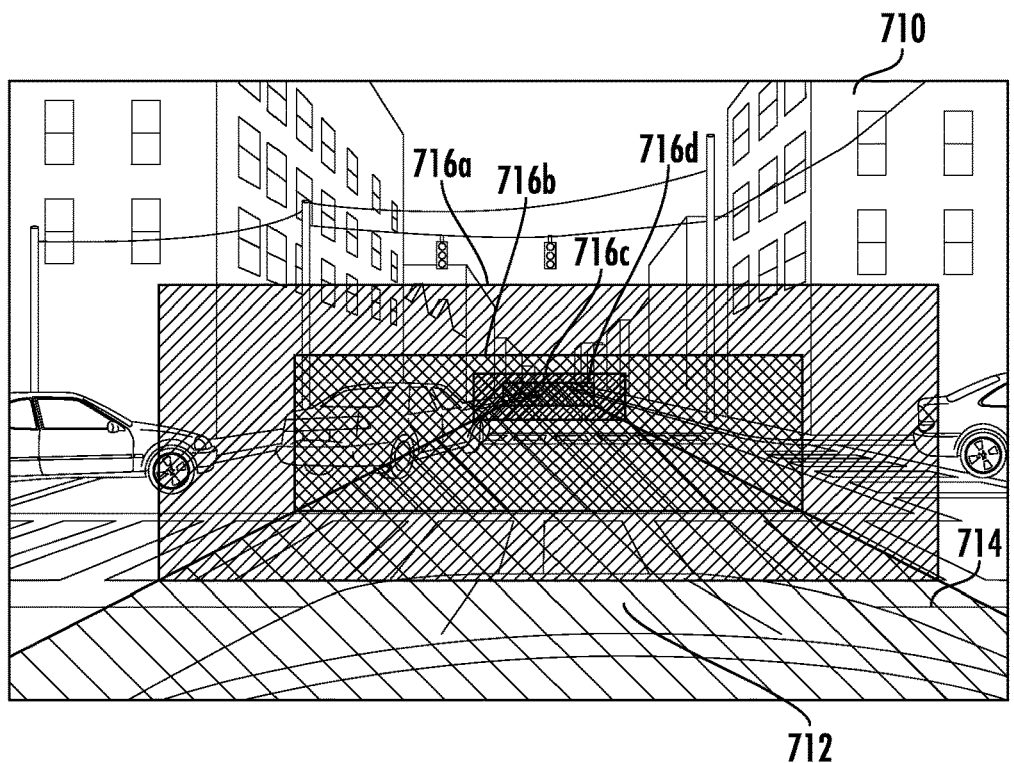
FIG. 15 depicts a third example aspect of region proposal determination within an image sample according to example aspects of the present disclosure.
Figure 16:
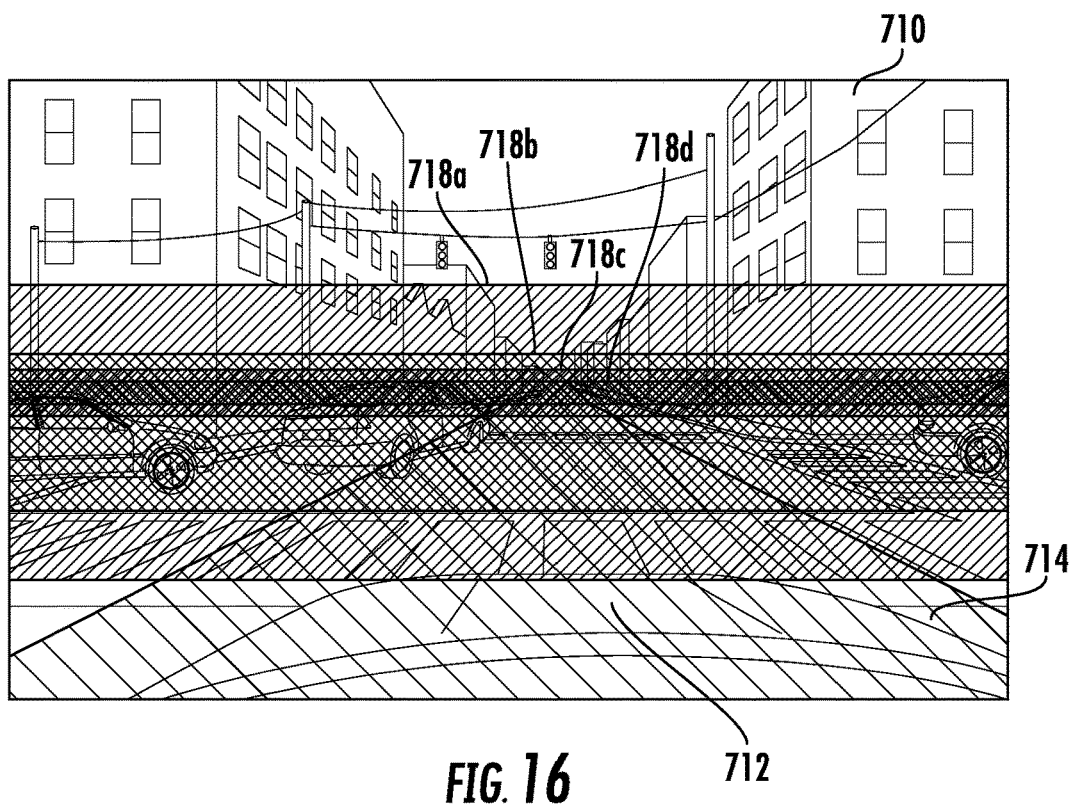
FIG. 16 depicts a fourth example aspect of region proposal determination within an image sample according to example aspects of the present disclosure.

With more particular reference to FIGS. 14-16, one or more region proposals can be determined for an image based at least in part on information determined from image data in a particular scene, without reliance on LIDAR data such as used in FIG. 13. Although use of LIDAR data in determining region proposals can provide accurate results in some examples, use of image data itself to determine region proposals without LIDAR data can also provide benefits. For example, when image data does not need to be synchronized with LIDAR data to determine region proposals, the region proposals can be generated more quickly and in real time or near real time to the time of image data capture.

FIGS. 14-16 depict image data 710 that is obtained in a geographic area surrounding an autonomous vehicle 712. Image data 710 includes a relative large portion of the image that is not likely to include an object of interest such as a pedestrian, bicycle, vehicle or the like. As such, region proposals can be determined within image data 710 based on information associated with the position of a camera configured to obtain image data 710 relative to the autonomous vehicle 712 and/or certain assumptions about the operational environment of the autonomous vehicle 712.

For example, a first region proposal 714 depicted in FIG. 14 can be determined as a static region within image data 710 inclusive of a vehicle travel path along a ground surface. The ground surface corresponding to vehicle travel path within region proposal 714 can be determined by assuming that the ground is substantially flat in a relatively short forward direction relative to autonomous vehicle 712, and that pedestrians or other objects of interest are likely to have a corresponding support surface on the ground within region proposal 714.

FIG. 15 depicts the same image data 710 obtained relative to autonomous vehicle 712 as depicted in FIG. 14, with additional region proposals 716 (e.g., 716*a*, 716*b*, 716*c* and 716*d*) determined at least in part based on an assumption that pedestrians or other objects of interest can appear smaller as they are located farther from a camera towards a horizon. Region proposals 716 can be determined as generally rectangular static regions within image data 710 inclusive of areas corresponding to a ground surface. In some implementations, each of the plurality of region proposals 716*a*-716*d* can be incrementally smaller and more focused within a portion of its previous region proposal 716 as it shifts away from autonomous vehicle 712 towards a fixed horizon. For example, region proposal 716*b* is smaller than region proposal 716*a* and located within a targeted subset of region proposal 716*a* towards a fixed horizon within the image data 710. Similarly, region proposal 716*c* is smaller than region proposal 716*b* and located within a targeted subset of region proposal 716*b* towards a fixed horizon within the image data 710, and region proposal 716*d* is smaller than region proposal 716*c* and located within a targeted subset of region proposal 716*c* towards a fixed horizon within the image data 710. Region proposals 716 can be used in addition to or as an alternative to region proposal 714.

FIG. 16 depicts the same image data 710 obtained relative to autonomous vehicle 712 as depicted in FIGS. 14-15, with additional region proposals 718 (e.g., 718*a*, 718*b*, 718*c* and 718*d*) determined at least in part based on an assumption that pedestrians or other objects of interest can appear smaller as they are located farther from a camera towards a horizon. Region proposals 718 can be determined as generally rectangular static regions within image data 710 that span the entire width of the image data 710. In some implementations, each of the plurality of region proposals 718*a*-718*d* can be incrementally smaller and more focused within a portion of its previous region proposal 718 as it shifts away from autonomous vehicle 712 towards a fixed horizon. For example, region proposal 718*b* is smaller than region proposal 718*a* and located within a targeted subset of region proposal 718*a* towards a fixed horizon within the image data 710. Similarly, region proposal 718*c* is smaller than region proposal 718*b* and located within a targeted subset of region proposal 718*b* towards a fixed horizon within the image data 710, and region proposal 718*d* is smaller than region proposal 718*c* and located within a targeted subset of region proposal 718*c* towards a fixed horizon within the image data 710. Region proposals 718 can be used in addition to or as an alternative to region proposal 714.

Figure 17:
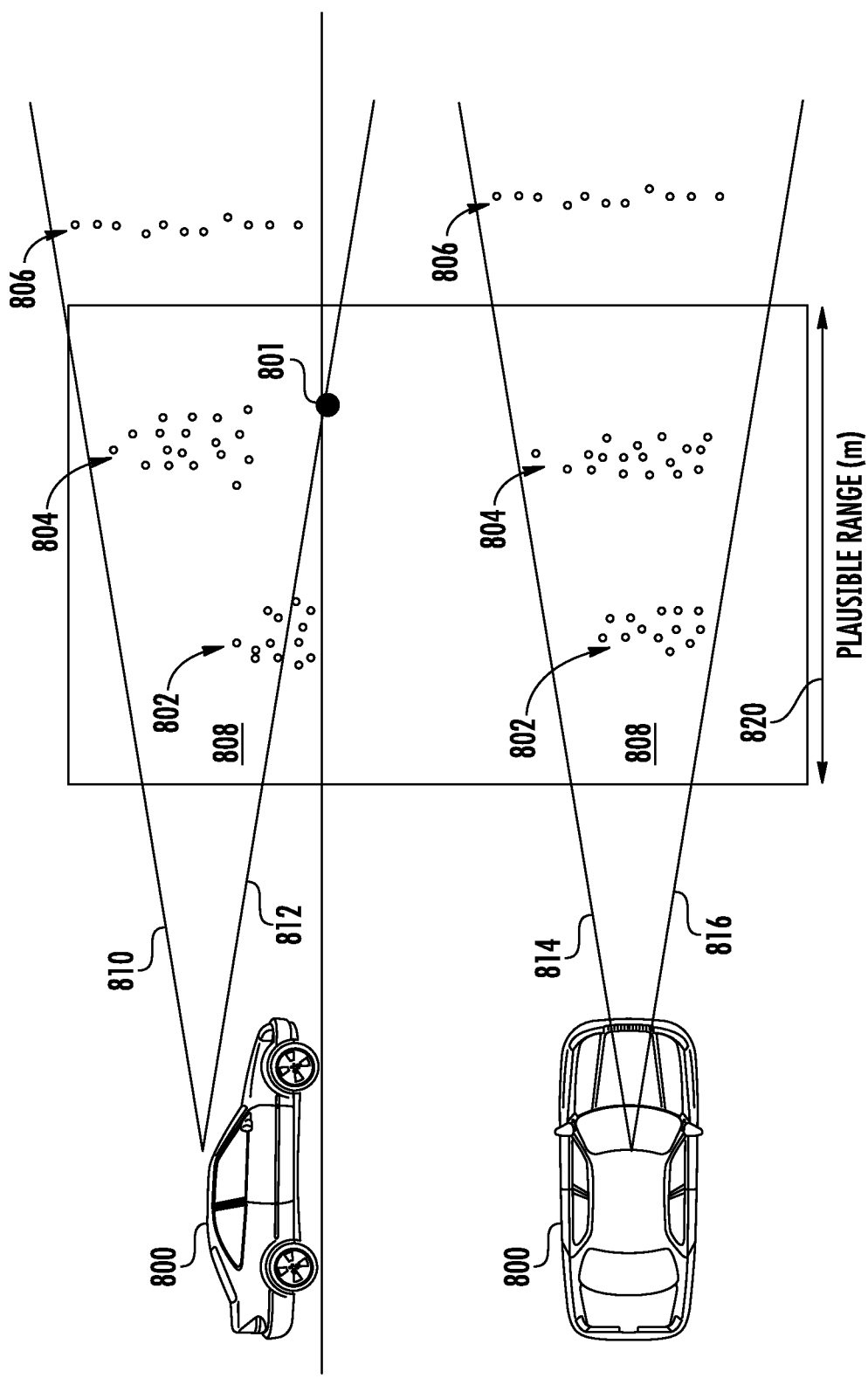
FIG. 17 depicts a first example aspect of determining LIDAR point data corresponding to an object of interest according to example embodiments of the present disclosure.
Figure 18:
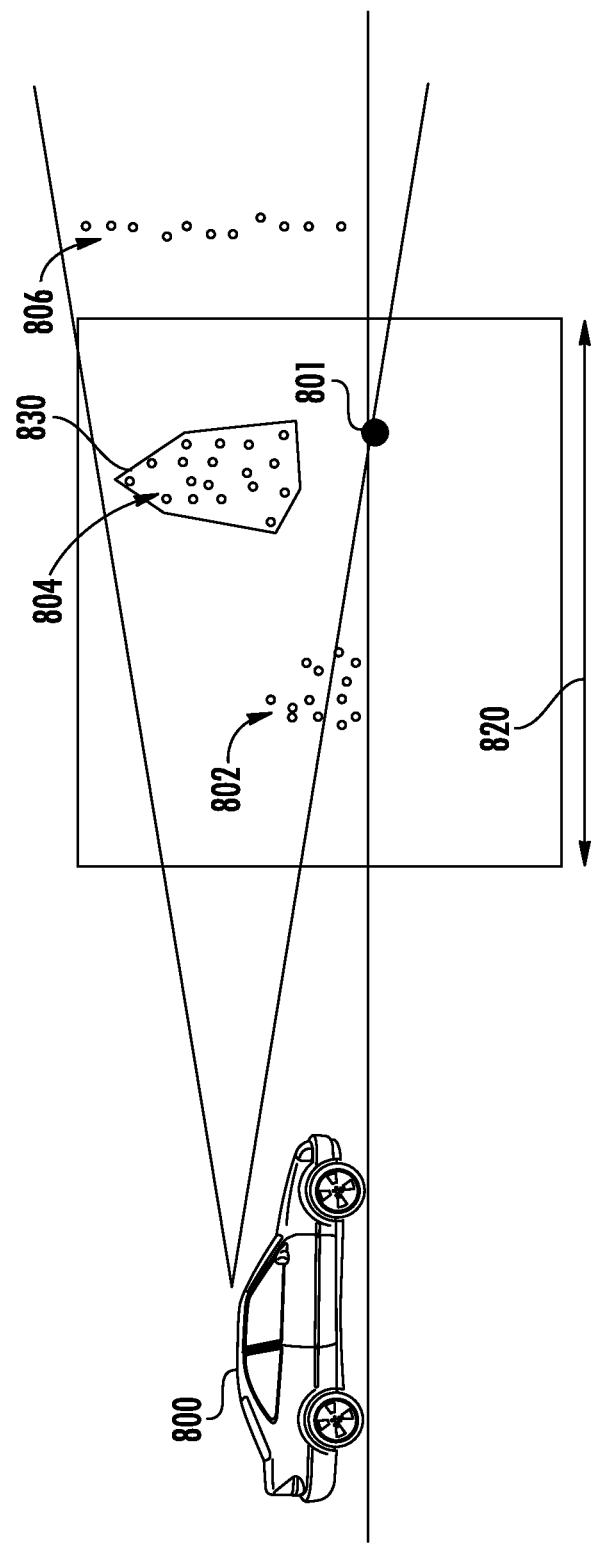
FIG. 18 depicts a second example aspect of determining LIDAR point data corresponding to an object of interest according to example embodiments of the present disclosure.

FIGS. 17 and 18 depict example aspects of determining LIDAR point data corresponding to an object of interest according to example embodiments of the present disclosure. LIDAR point data corresponding to objects of interest detected within image data can be desired so that a segmentation layer including both image data and corresponding LIDAR data for a particular object of interest can be relayed to a perception system, such as perception system 106 of FIGS. 1, 3, and 4. Various heuristic techniques can utilize one or more parameters associated with the image data and/or LIDAR data captured relative to a vehicle in order to identify which point cluster within a LIDAR point cloud corresponds to an object detected within an image.

In some implementations, heuristic techniques can utilize one or more parameters determined for a detected object within the image data, including for example, an estimated support location for an object of interest, one or more estimated size dimensions (e.g., width and/or height) of an object of interest, and/or an estimated distance from the camera or vehicle on which a camera is mounted to the detected object of interest. For example, estimated support locations for objects of interest (e.g., pedestrians, etc.) can be determined within each image and/or image sample. In some examples, the estimated support locations can vary based on the type of object of interest. For example, an estimated support location for a pedestrian can correspond to a location within an image corresponding to the feet of a pedestrian, while an estimated support location for a vehicle or bicycle can correspond to a location within an image corresponding to one or more wheels.

For pedestrian detection, determining an estimated support location for a pedestrian can sometimes depend on whether the feet of the pedestrian are visible within the image. When feet of a pedestrian are visible, determining an estimated support location for the pedestrian within the image can include determining a location within the image that corresponds to the feet of the pedestrian. When the feet of the pedestrian are not visible, determining an estimated support location for the pedestrian within the image can include determining a location within the image that corresponds to the head of the pedestrian and determining the support location for the pedestrian based at least in part on the location within the image that corresponds to the head of the pedestrian and an estimated height of the pedestrian. Estimated size dimensions for a detected pedestrian or other objects of interest can also be either measured directly from image data or inferred from one or more visible edges of the object in the image.

In some implementations, the estimated location of the pedestrian can be improved by obtaining map data (e.g., map data 218 of FIG. 3) descriptive of a geographic area surrounding the vehicle. The map data can include relative locations of ground surfaces proximate to the vehicle. A revised estimated location of the pedestrian or other object of interest within three-dimensional space can be based at least in part on the estimated location and the map data. For example, a revised estimated location can be adjusted from an (initial) estimated location to the nearest point within three-dimensional space corresponding to a surface on the ground as identified within the map data. This technique for improving an estimated location of the pedestrian operates under the assumption that detected pedestrians will be walking on a ground surface as opposed to being suspended in the air or some other unfeasible or unlikely location. The use of map data can help improve the accuracy of estimated locations and/or otherwise provide appropriate boundary parameters for permissible object locations.

When an estimated support location for a pedestrian or other object of interest is determined from image data, the estimated support location within the image and a known location of a camera that obtained the image data relative to the ground can be used together to determine an estimated distance to the pedestrian or other detected object from the cameras and/or vehicle on which the camera is mounted. This estimated distance can also be used in part to analyze LIDAR point data to determine a portion of LIDAR data that corresponds to a detected object of interest within corresponding image data.

Referring more particularly to FIG. 17, an example autonomous vehicle 800 is depicted as capturing LIDAR point cloud data including a plurality of candidate LIDAR point clusters 802, 804, and 806, each candidate LIDAR point cluster 802-806 presumed to correspond to one or more distinct objects of interest. For example, candidate LIDAR point cluster 802 could correspond to a small bush or other piece of foliage, while candidate LIDAR point cluster 804 could correspond to a pedestrian, and candidate LIDAR point cluster 806 could correspond to a portion of a building. The upper portion of FIG. 17 depicts a side view of the autonomous vehicle 800 and corresponding candidate LIDAR point clusters 802-806, while the lower portion of FIG. 17 depicts a plan view of the autonomous vehicle 800 and corresponding candidate LIDAR point clusters 802-806.

In some implementations, the parameters determined from image data corresponding to a detected object (e.g., estimated support location for an object of interest, one or more estimated size dimensions (e.g., width and/or height) of an object of interest, and/or an estimated distance from the camera or vehicle on which a camera is mounted to the detected object of interest) can be used to generate a fixed region of where corresponding candidate LIDAR point clusters can be within a point cloud. FIG. 17 depicts an example fixed region 808 determined from such image data parameters, including, for example, an estimated support location 801 for a detected object. Fixed region 808 can include, for example, an upper bound 810, lower bound 812, first side bound 814 and/or second side bound 816. By determining fixed region 808 relative to an estimated support location 801 or other image data parameter(s) for a detected object, the three candidate LIDAR point clusters 802, 804, and 806 can be identified as candidate LIDAR point clusters potentially corresponding to an object of interest detected within corresponding image data. The parameters determined from image data corresponding to a detected object can also be used to determine a plausible range from a vehicle (e.g., plausible range 820 in FIG. 17) in which a detected object of interest is most likely to be found within corresponding LIDAR point data.

Referring still to FIG. 17, additional parameters can be determined for each of the candidate LIDAR point clusters 802-806 to help determine which cluster most reasonably corresponds to a detected object of interest (e.g., a pedestrian). For instance, parameters such as but not limited to a size dimension (e.g., height and/or width), a number of LIDAR data points, and/or a location for the closest support surface of each candidate LIDAR point cluster 802-806 can be determined. Based on an analysis of the parameters determined from the image data and/or the parameters determined for the candidate LIDAR point clusters 802-806, a determination can be made (as depicted in FIG. 18) that candidate LIDAR point cluster 804 is chosen as a selected LIDAR point cluster 830 most likely to correspond to a pedestrian. Selected LIDAR point cluster 830 can then be matched with a portion of image data corresponding to the detected pedestrian and layered for relay to an object classification application such as may reside within perception system 106 of FIGS. 1, 3, and 4.

FIG. 19 depicts a flow chart diagram of an example method 900 of detecting objects of interest according to example embodiments of the present disclosure. One or more portion(s) of the method 900 can be implemented by one or more electronic devices such as computing devices (e.g., within vehicle computing system 206) or by programmable circuit devices (e.g., FPGA device 130 of FIG. 2 or FPGA device 420 of FIG. 5). Moreover, one or more portion(s) of the method 900 can be implemented as an algorithm on the hardware components of the device(s) described herein (e.g., as in FIGS. 1-7). FIG. 19 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (902), method 900 can include identifying an object of interest (e.g., a pedestrian, vehicle, bicycle, etc.) within an image obtained from a camera positioned relative to a vehicle. More particular aspects of identifying an object of interest within an image are depicted in and described with reference to FIG. 20. At (904)-(912), various steps can be implemented to help localize objects detected at (902) to help determine an estimated location of the object of interest within three-dimensional (3D) space.

For example, at (904), method 900 can optionally include determining an estimated support location for the object of interest within the image. In some implementations (e.g., when the object of interest is a pedestrian and a lower bound (e.g., feet) of the pedestrian are visible in the image), determining an estimated support location for an object of interest at (904) can include determining a location within the image corresponding to the lower bound (e.g., feet) of the pedestrian. In some implementations (e.g., when the object of interest is a pedestrian and a lower bound (e.g., feet) of the pedestrian are not visible in the image), determining an estimated support location for an object of interest at (904) can include determining a location within the image corresponding to an upper bound (e.g., head) of the pedestrian and then determining the support location for the pedestrian based at least in part on the location within the image corresponding to the upper bound (e.g., head) of the pedestrian and an estimated height of the pedestrian. An estimated support location optionally determined at (904) can correspond to one exemplary approach for helping to localize a detected object of interest.

In other implementations, method (900) can additionally or alternatively include steps (906) and (908) as part of localization for a detected object. In such implementations, at (906), method (900) can include obtaining a first supplemental portion of data associated with the object of interest identified at (902). The first supplemental portion of data obtained at (906) can be obtained from a first sensor other than the camera used to obtain the image considered at (902). For example, with reference to FIG. 3, the first sensor can correspond to a sensor within LIDAR system 222, RADAR system 224, camera(s) 226, position sensor 228, or other sensors. As such, the first supplemental portion of data obtained at (904) can correspond to LIDAR data from LIDAR system 222, RADAR data from RADAR system 224, image data from a different camera 226 than the camera that obtained the image used to identify the object of interest at (902), position data from position sensor 228, map data 218, or data from other sensors 204 than those illustrated in FIG. 3. At (908), method 900 can include determining an estimated location of the object of interest within three-dimensional space based at least in part on the first supplemental portion of data obtained at (906).

In a particular example, obtaining a first supplemental portion of data at (906) can include obtaining LIDAR data obtained at substantially the same time as the image data obtained from a camera and used to identify an object of interest at (902). An estimated location of the object of interest can be determined at (908) by identifying a cluster of LIDAR data points of a predetermined size corresponding to the detected object of interest (e.g., a predetermined size associated with a pedestrian, vehicle, etc.) near a location within a LIDAR point cloud corresponding to the location of the object of interest within the image used to identify the object of interest at (902). More particular aspects of an example determination at (908) of an estimated location of an object of interest within a portion of LIDAR point data is depicted in and described with reference to FIGS. 17-18.

In another particular example, if the first supplemental portion of data obtained at (906) corresponds to RADAR data, then an estimated location of the object of interest can be determined at (908) by analyzing the RADAR data relative to a detected object of interest. For instance, if the object of interest detected at (902) corresponds to a vehicle, RADAR data can indicate a specific type of reaction to the metal in a vehicle. Determining an estimated location of the vehicle at (908) can be done in part by analyzing this reactive response within the RADAR data to help determine where the vehicle is located within the first supplemental portion of data.

In another particular example, if the first supplemental portion of data obtained at (906) corresponds to image data (e.g., image data obtained from a different camera than the camera used to obtain an image in which an object of interest is detected at (902)), then image-based photogrammetry principles can be used to determine a relative position of the object of interest by geometrically comparing points within the different images and corresponding distances between such points. In some implementations, when the first supplemental portion of data obtained at (906) corresponds to image data, texture of objects within the image data can also be used by monitoring changes in texture, which change as an object changes locations. Such image-based changes in object texture identified within image data obtained at (906) can also be used in part to help determine an estimated location of the object of interest at (908).

In some implementations, method (900) can still further include optional steps (910) and (912) as part of localization for a detected object. In such implementations, at (910), method (900) can include obtaining a second supplemental portion of data associated with the object of interest identified at (902). The second supplemental portion of data obtained at (910) can be obtained from a second sensor other than the camera used to obtain the image considered at (902) and other than the first sensor. For example, with reference to FIG. 3, the second sensor can correspond to a sensor within LIDAR system 222, RADAR system 224, camera(s) 226, position sensor 228, or other sensors. As such, the second supplemental portion of data obtained at (910) can correspond to LIDAR data from LIDAR system 222, RADAR data from RADAR system 224, image data from a different camera 226 than the camera that obtained the image used to identify the object of interest at (902), position data from position sensor 228, map data 218, or data from other sensors 204 than those illustrated in FIG. 3. At (912), method 900 can include determining a revised estimated location of the object of interest within three-dimensional space based at least in part on the second supplemental portion of data obtained at (910). By considering both a first supplemental portion of data and a second supplemental portion of data, a revised estimated location determined at (912) can seek to be more refined than an estimated location determined only using image data at (904) and/or a first supplemental portion of data at (906) and (908).

In one example implementation, a second supplemental portion of data obtained at (910) can include obtaining map data descriptive of a geographic area surrounding the vehicle. At (912), a revised estimated location of the pedestrian within three-dimensional space can be determined based at least in part on the estimated location determined at (908) and the map data obtained at (910). Additional examples described herein relative to (906) and (908) (e.g., descriptive of supplemental data corresponding to LIDAR data, RADAR data, image data, etc.) also apply to (910) and (912) respectively.

At (914), method 900 can include providing at least a portion of the image corresponding to the object of interest as identified at (902), the estimated location of the object of interest within three-dimensional space as determined at (908) and/or revised at (912), the first supplemental portion of data obtained at (906), and/or the second supplemental portion of data obtained at (910) to an object classification application. An example object classification application can be included within a perception system, such as but not limited to perception system 106 of FIGS. 1, 3, and 4.

FIG. 20 depicts a flow chart diagram of an example method 920 of detecting objects of interest according to example embodiments of the present disclosure. More particularly, method 920 can include one or more tasks or features for identifying an object of interest (e.g., a pedestrian) within an image obtained from a camera positioned relative to a vehicle. One or more portion(s) of the method 920 can be implemented by one or more electronic devices such as computing devices (e.g., within vehicle computing system 206) or by programmable circuit devices (e.g., FPGA device 130 of FIG. 1 or FPGA device 420 of FIG. 5). Moreover, one or more portion(s) of the method 920 can be implemented as an algorithm on the hardware components of the device(s) described herein (e.g., as in FIGS. 1-7).

FIG. 20 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. For example, method 920 can additionally or alternatively include one or more functions implemented by FPGA device 130 of FIG. 2, including but not limited to bit conversion, de-Bayering, gamma correction, color space conversion, rectification, anti-aliasing, resizing, Sobel filtering, angle binning, convolution filtering, pooling, and classification.

At (922), method 920 can include receiving image data from one or more cameras. The image data received at (922) can correspond, for example, to image data 102 described with reference to FIGS. 1-2 or raw image capture data received from one or more cameras (e.g., camera(s) 226 of FIG. 3 or cameras 402, 403, 405 of FIG. 5).

At (924), method 920 can include generating a multi-scale image pyramid of multiple image samples having different scaling factors. Generating a multi-scale image pyramid at (924) can be implemented, for example, by the resizing component 147 of FPGA device 130, such as illustrated in and described with reference to FIG. 2. An example image pyramid of multiple image samples as generated at (924) is depicted in FIG. 8.

At (926), method 920 can include determining one or more region proposals within each image sample. Each region proposal determined at (926) can have a smaller area than its corresponding image or image sample in order to reduce the amount of area searched for objects of interest. In some implementations, region proposals determined at (926) can be determined at least in part from locations within an image (e.g., image data received at (922)) corresponding to locations for which corresponding LIDAR point data is also obtained. In some implementations, region proposals determined at (926) can be determined at least in part from locations within an image (e.g., the image data obtained at 922) determined to correspond to foreground as opposed to background. In some implementations, region proposals determined at (926) can be determined as one or more static regions within a given image and/or image scale inclusive of a vehicle travel path along a ground surface and/or region portions located towards a fixed horizon. Examples of region proposals determined at (926) are depicted in and described with reference to FIGS. 13-16.

At (928), method 920 can include analyzing successive image patches within each of the multiple image samples using a sliding window of fixed size. Examples of sliding window analysis such as implemented at (928) are depicted in and described with reference to FIGS. 9-12. At (930), method 920 can include pooling, by the one or more programmable circuit devices, image patches associated by like features into image regions within each of the multiple image samples. Analyzing successive image patches within each of the multiple image samples at (928) and pooling image patches associated by like features into image regions at (930) can be implemented, for example, by the pooling component 154 of FPGA device 130, such as illustrated and described with reference to FIG. 2.

At (932), method 920 can include accessing a classification model that classifies image regions as including or not including detected objects. In some implementations, the classification model accessed at (932) can have been trained to receive one or more image regions and in response to receipt of the one or more image regions provide a class prediction output. In some implementations, the classification model accessed at (932) can correspond, for example, to classification model 118 of FIG. 1, classification model 160 of FIG. 2, classification model 510 of FIG. 7 or classification model 540 of FIG. 7.

At (934), method 920 can include providing the image regions from (930) as input to the classification model accessed at (932). In some implementations, multiple image regions can be provided as an input vector to the classification model accessed at (930). In some implementations, multiple image regions or vectors of image regions can be provided at (934) to multiple instances of a classification model such that parallel classifications can be made at or near a same point in time. In some implementations, one or more image regions can be provided at (934) to one or more instances of a classification model accessed at (932) in an iterative fashion such that outputs from the classification model can be iteratively received at (934).

At (936), method 920 can include receiving an output of the classification model corresponding to detected objects of interest within the image data. For example, in some implementations, an output of the classification model received at (936) can include a class prediction output. A class prediction output can correspond, for example, to a determination of whether an image region includes or does not include one or more classes of objects. For example, the class prediction output can correspond to a classification selected from a predetermined set of classifications (e.g., pedestrian, vehicle, bicycle, no object). In some implementations, the class prediction output can also include a probability score associated with each classification indicating a likelihood that the determined classification is accurate.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for detecting objects, comprising:
   receiving, by a computing system that comprises one or more electronic devices, image data from one or more cameras;
   generating, by the computing system, from the image data, a multi-scale image pyramid of multiple image samples having different scaling factors;
   determining, by the computing system, one or more region proposals within each image sample, wherein each region proposal has a smaller area than its corresponding image sample, and wherein determining the one or more region proposals within each image sample comprises determining one or more static regions within each image sample that are inclusive of one or more of a location associated with a vehicle travel path along a ground surface or a location associated with a fixed horizon, wherein at least one of the one or more static regions is incrementally smaller and more focused within a targeted subset of at least another of the one or more static regions;
   analyzing, by the computing system, successive image patches within each static region using a sliding window of fixed size to determine if the successive image patches include an object of interest; and
   providing, by the computing system, image patches determined to include the object of interest to an object classification application.

2. The method of claim 1, wherein determining the one or more region proposals within each image sample comprises determining locations within each image sample that correspond to locations for which LIDAR point data is also received by the computing system.

3. The method of claim 1, wherein determining the one or more region proposals within each image sample comprises determining locations within each image sample determined to correspond to a foreground region as opposed to a background region.

4. The method of claim 3, wherein determining the locations within each image sample determined to correspond to the foreground region as opposed to the background region comprises applying a LIDAR background subtraction filter to LIDAR data corresponding to the respective image sample.

5. The method of claim 1, wherein determining the one or more region proposals within each image sample comprises determining one or more static regions within each image sample that are inclusive of a vehicle travel path along a ground surface.

6. The method of claim 1, wherein determining the one or more region proposals within each image sample comprises determining one or more static regions within each image sample that are located toward a fixed horizon.

7. The method of claim 1, wherein analyzing the successive image patches within each static region using the sliding window of fixed size to determine if the successive image patches include the object of interest comprises:
   accessing, by the computing system, a classification model that classifies image regions as including or not including detected objects;
   providing, by the computing system, image regions from the successive image patches within each static region as input to the classification model; and
   receiving, by the computing system, an output of the classification model corresponding to detected objects of interest within the image data.

8. The method of claim 7, further comprising pooling, by the computing system, the successive image patches associated by like features into image regions within each of the multiple image samples, and wherein the image regions are provided as input to the classification model.

9. The method of claim 7, wherein the classification model comprises a deep neural network.

10. A detection system, comprising:
    a camera positioned relative to a vehicle and configured to obtain image data within an area proximate to the vehicle;
    a LIDAR sensor positioned relative to the vehicle and configured to obtain LIDAR point data within an area proximate to the vehicle;
    one or more electronic devices coupled to the camera and the LIDAR sensor, the one or more electronic devices configured to receive the image data from the camera and the LIDAR point data from the LIDAR sensor and to perform operations comprising:
      generating, from the image data, a multi-scale image pyramid of multiple image samples having different scaling factors;
      determining, based at least in part on the LIDAR point data, one or more region proposals within each image sample, wherein each region proposal has a smaller area than its corresponding image sample, and wherein determining the one or more region proposals within each image sample comprises determining one or more static regions within each image sample that are inclusive of one or more of a location associated with a vehicle travel path along a ground surface or a location associated with a fixed horizon, wherein at least one of the one or more static regions is incrementally smaller and more focused within a targeted subset of at least another of the one or more static regions; and
      analyzing successive image patches within each static region using a sliding window of fixed size to determine if the successive image patches include an object of interest.

11. The detection system of claim 10, wherein the operations further comprise providing one or more of at least a portion of the image data corresponding to the object of interest and the portion of the LIDAR point data corresponding to the object of interest to a computing system of the vehicle.

12. The detection system of claim 10, wherein determining the one or more region proposals within each image sample comprises determining locations within each image sample that correspond to locations for which the LIDAR point data is also received by the one or more electronic devices.

13. The detection system of claim 10, wherein determining the one or more reaion proposals within each image sample comprises determining locations within each image sample determined to correspond to a foreground region as opposed to a background region.

14. The detection system of claim 13, wherein determining locations within each image sample determined to correspond to the foreground as opposed to the background comprises applying a LIDAR background subtraction filter to the LIDAR point data corresponding to the image sample.

15. The detection system of claim 10, wherein analyzing the successive image patches within each static region using the sliding window of fixed size to determine if the successive image patches include the object of interest comprises:
- accessing a classification model that classifies image regions as including or not including detected objects;
- providing image regions from the successive image patches within each image sample as input to the classification model; and
- receiving an output of the classification model corresponding to detected objects of interest within the image data.

16. An autonomous vehicle, comprising:
- one or more cameras configured to obtain image data within an environment proximate to an autonomous vehicle;
- a field programmable gate array (FPGA) device coupled to the one or more cameras, the FPGA device configured to receive the image data from the one or more cameras, generate from the image data a multi-scale image pyramid of multiple image samples having different scaling factors, determine one or more region proposals within each image sample, wherein each region proposal has a smaller area than its corresponding image sample, wherein the one or more region proposals comprise one or more static regions within each image sample that are inclusive of one or more of a location associated with a vehicle travel path along a ground surface or a location associated with a fixed horizon, wherein at least one of the one or more static regions is incrementally smaller and more focused within a targeted subset of at least another of the one or more static regions, and analyze successive image patches within each of the static regions using a sliding window of fixed size to identify objects of interest within the successive image patches;
- one or more processors; and
- one or more non-transitory computer-readable media that collectively store instructions that, when executed by the one or more processors, cause the one or more processors to perform operations, the operations comprising providing at least a portion of the image data corresponding to each object of interest to a computing system of the autonomous vehicle.

17. The autonomous vehicle of claim 16, further comprising:
- a LIDAR sensor positioned relative to the autonomous vehicle and configured to obtain LIDAR point data within an area proximate to the autonomous vehicle; and
- wherein the one or more region proposals within each image sample are determined at least in part from the LIDAR point data.

18. The autonomous vehicle of claim 17, wherein the one or more region proposals for each image sample are determined at least in part from locations within each image sample corresponding to locations for which the corresponding LIDAR point data is also obtained.

19. The autonomous vehicle of claim 16, wherein the one or more region proposals are determined at least in part from locations within each image sample determined to correspond to a foreground region as opposed to a background region.

* * * * *